(12) United States Patent
Niskanen

(10) Patent No.: US 11,514,689 B2
(45) Date of Patent: Nov. 29, 2022

(54) GEMOLOGICAL OBJECT RECOGNITION

(71) Applicant: ENGEMMA OY, Kemi (FI)

(72) Inventor: Kari Niskanen, Keminmaa (FI)

(73) Assignee: ENGEMMA OY, Kemi (FI)

( * ) Notice: Subject to any disclaimer, the term of this patent is extended or adjusted under 35 U.S.C. 154(b) by 332 days.

(21) Appl. No.: 16/499,798

(22) PCT Filed: Mar. 28, 2018

(86) PCT No.: PCT/FI2018/050233
§ 371 (c)(1),
(2) Date: Sep. 30, 2019

(87) PCT Pub. No.: WO2018/178517
PCT Pub. Date: Oct. 4, 2018

(65) Prior Publication Data
US 2020/0050834 A1    Feb. 13, 2020

Related U.S. Application Data

(60) Provisional application No. 62/478,221, filed on Mar. 29, 2017.

(51) Int. Cl.
*G06K 9/00* (2022.01)
*G06V 20/64* (2022.01)
*G06K 9/62* (2022.01)
*H04N 5/225* (2006.01)
*G06V 10/22* (2022.01)

(52) U.S. Cl.
CPC ......... *G06V 20/653* (2022.01); *G06K 9/6215* (2013.01); *G06V 10/225* (2022.01); *H04N 5/2256* (2013.01); *H04N 5/2259* (2013.01); *G06V 2201/07* (2022.01); *G06V 2201/121* (2022.01)

(58) Field of Classification Search
None
See application file for complete search history.

(56) References Cited

U.S. PATENT DOCUMENTS 6,917,421 B1 * 7/2005 Wihl ................. G01B 11/0608
356/624
8,704,931 B2 * 4/2014 Noh ..................... H04N 9/8227
348/333.05

(Continued)

FOREIGN PATENT DOCUMENTS

JP    2010204293 A  *  9/2010

OTHER PUBLICATIONS

International Search Report and Written Opinion, dated Jun. 28, 2018, from corresponding PCT appliation No. PCT/FI2018/050233.

*Primary Examiner* — Feng Niu
(74) *Attorney, Agent, or Firm* — Nixon & Vanderhye

(57) ABSTRACT

Disclosed is a system, method, and devices as system elements to recognize an object by an object recognizing system including an imaging device and a moving assembly to move the imaging device around the object, to form a certified visual model of the object to be recognized. Especially the disclosure relates to gemstone imaging by an imaging method including photographing a target, in an illumination, by a camera, to obtain at least one image of the targeted object to be recognized.

29 Claims, 12 Drawing Sheets
(6 of 12 Drawing Sheet(s) Filed in Color)

(56) References Cited

U.S. PATENT DOCUMENTS

| | | | |
|---|---|---|---|
| 8,784,301 B2* | 7/2014 | McDowall | G02B 23/2415 600/109 |
| 9,497,389 B2* | 11/2016 | Kasahara | H04N 5/2256 |
| 9,782,056 B2* | 10/2017 | McDowall | H04N 13/243 |
| 9,792,690 B2* | 10/2017 | Kinoshita | H04N 5/232133 |
| 9,909,238 B2* | 3/2018 | Wolf | G06T 7/0008 |
| 2003/0072037 A1* | 4/2003 | Hamilton | H04N 1/32208 358/3.28 |
| 2003/0142877 A1* | 7/2003 | George | H04N 5/23229 359/708 |
| 2004/0023612 A1* | 2/2004 | Kriesel | G06V 20/64 452/157 |
| 2005/0091599 A1* | 4/2005 | Yamakado | G06F 40/103 358/1.18 |
| 2005/0103840 A1* | 5/2005 | Boles | G01N 21/87 705/28 |
| 2005/0198575 A1* | 9/2005 | Liu | G06V 20/46 715/723 |
| 2006/0164623 A1* | 7/2006 | Wagner | G06Q 30/0631 356/30 |
| 2006/0190810 A1* | 8/2006 | Piersol | G06F 40/226 715/236 |
| 2007/0071404 A1* | 3/2007 | Curtner | G11B 27/105 386/230 |
| 2009/0244090 A1* | 10/2009 | Zhang | G06V 10/145 348/46 |
| 2010/0271394 A1* | 10/2010 | Howard | G06F 3/011 345/633 |
| 2011/0085059 A1* | 4/2011 | Noh | H04N 9/8227 348/231.99 |
| 2012/0007971 A1 | 1/2012 | Schnitzer et al. | |
| 2012/0274751 A1 | 11/2012 | Smith et al. | |
| 2013/0038689 A1* | 2/2013 | McDowall | H04N 5/232 348/45 |
| 2014/0139608 A1* | 5/2014 | Rosario | B23K 26/359 347/225 |
| 2014/0235945 A1* | 8/2014 | McDowall | H04N 13/257 600/111 |
| 2014/0240552 A1* | 8/2014 | Kasahara | H04N 5/33 348/239 |
| 2015/0312463 A1* | 10/2015 | Gupta | H04N 5/2355 348/239 |
| 2015/0373319 A1* | 12/2015 | Kinoshita | H04N 5/232123 348/46 |
| 2016/0167164 A9* | 6/2016 | Rosario | B23K 26/0006 347/225 |
| 2016/0171744 A1 | 6/2016 | Rhoads et al. | |
| 2016/0177481 A1* | 6/2016 | Wolf | H04N 5/77 700/140 |
| 2016/0203495 A1* | 7/2016 | Koh | G06Q 10/06 705/317 |
| 2016/0232432 A1* | 8/2016 | Regev | G06V 20/69 |
| 2016/0313548 A1* | 10/2016 | Fujii | H04N 13/218 |
| 2017/0012926 A1* | 1/2017 | Lennan | G06F 16/78 |
| 2017/0276954 A1* | 9/2017 | Bajorins | G03B 37/00 |
| 2020/0057001 A1* | 2/2020 | Kerner | G01N 21/87 |

* cited by examiner

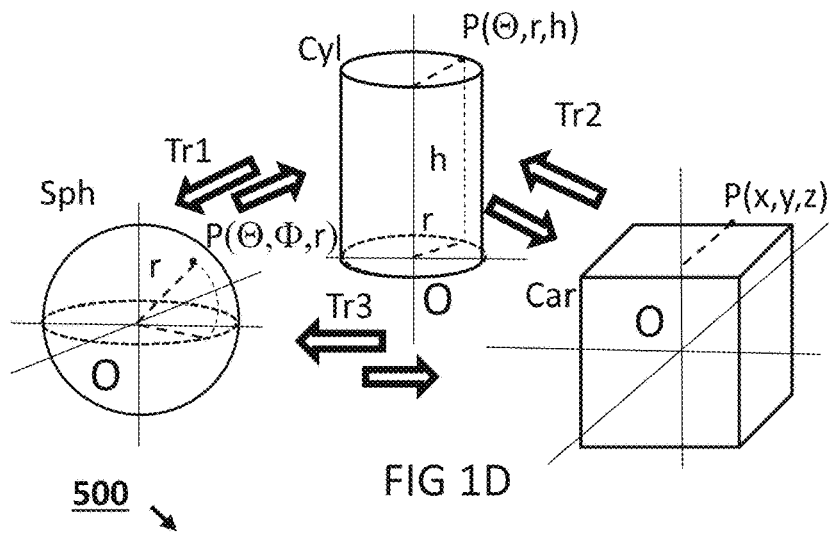
FIG 1D
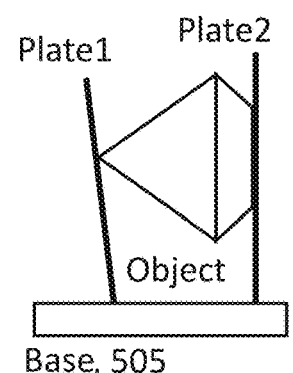
FIG 1E
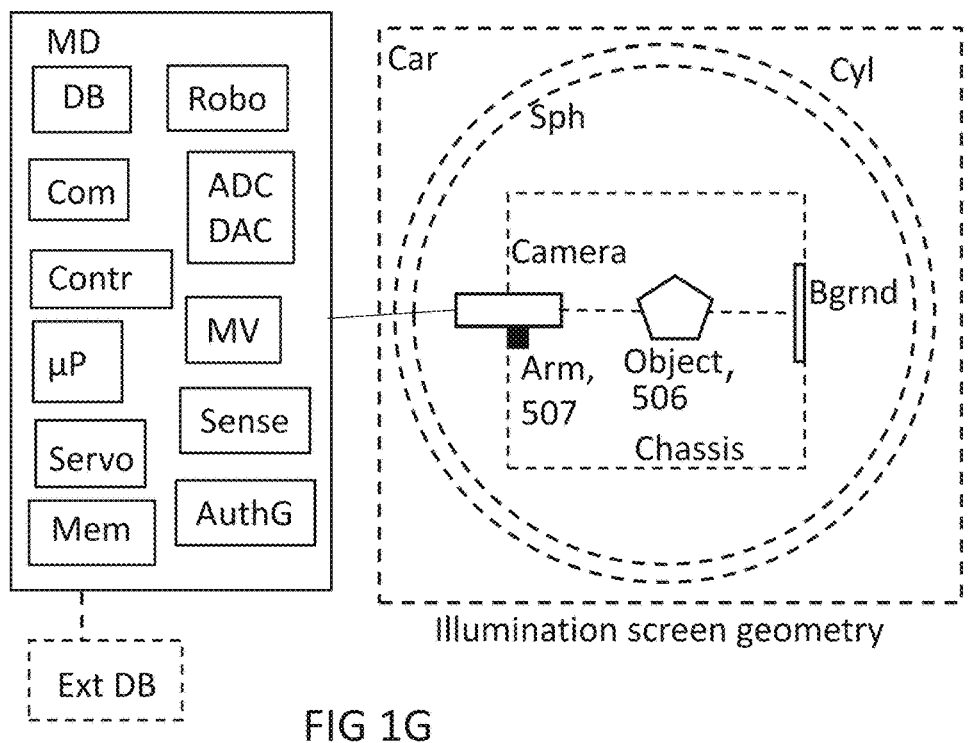
FIG 1G
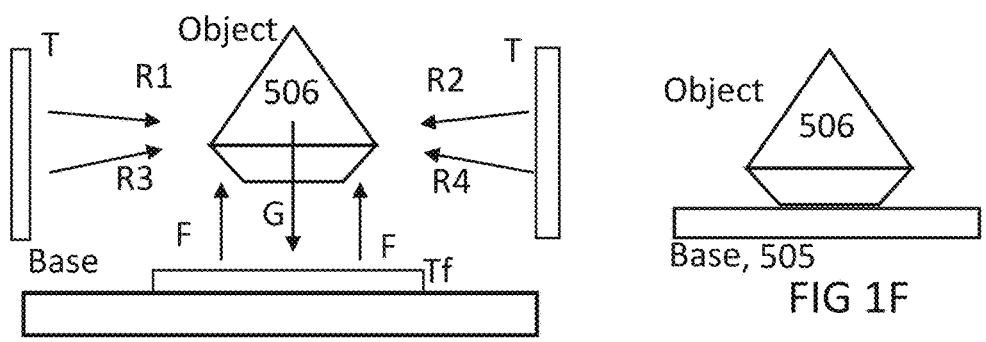
FIG 1H
FIG 1F

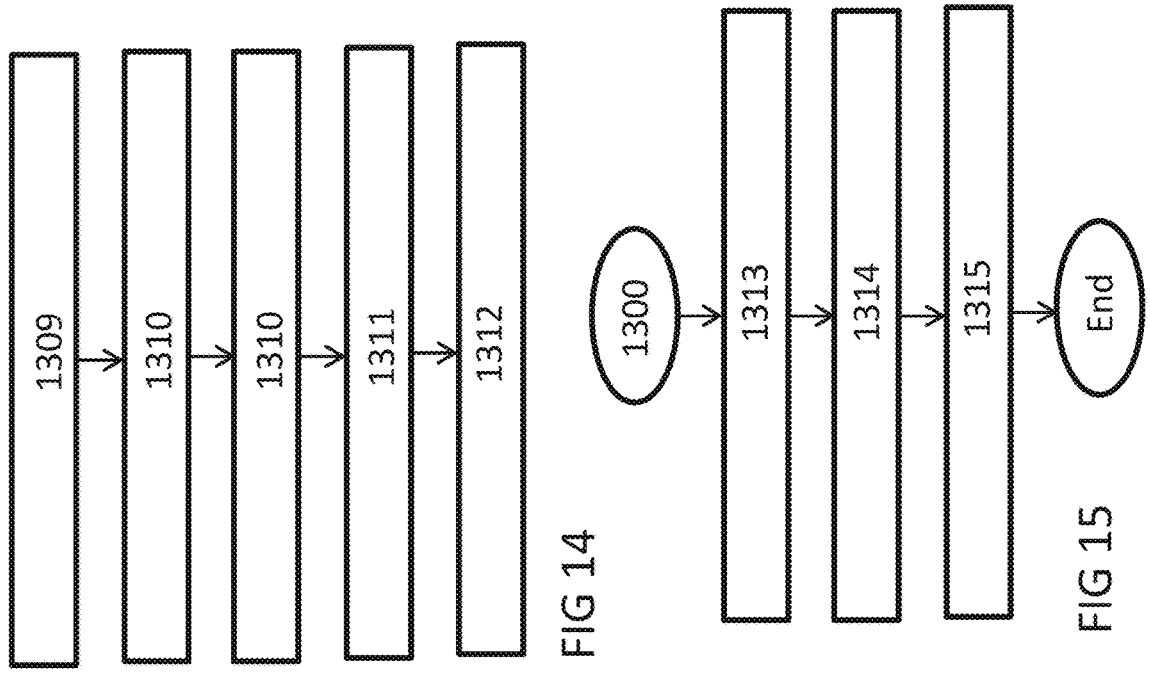
FIG 14
FIG 15
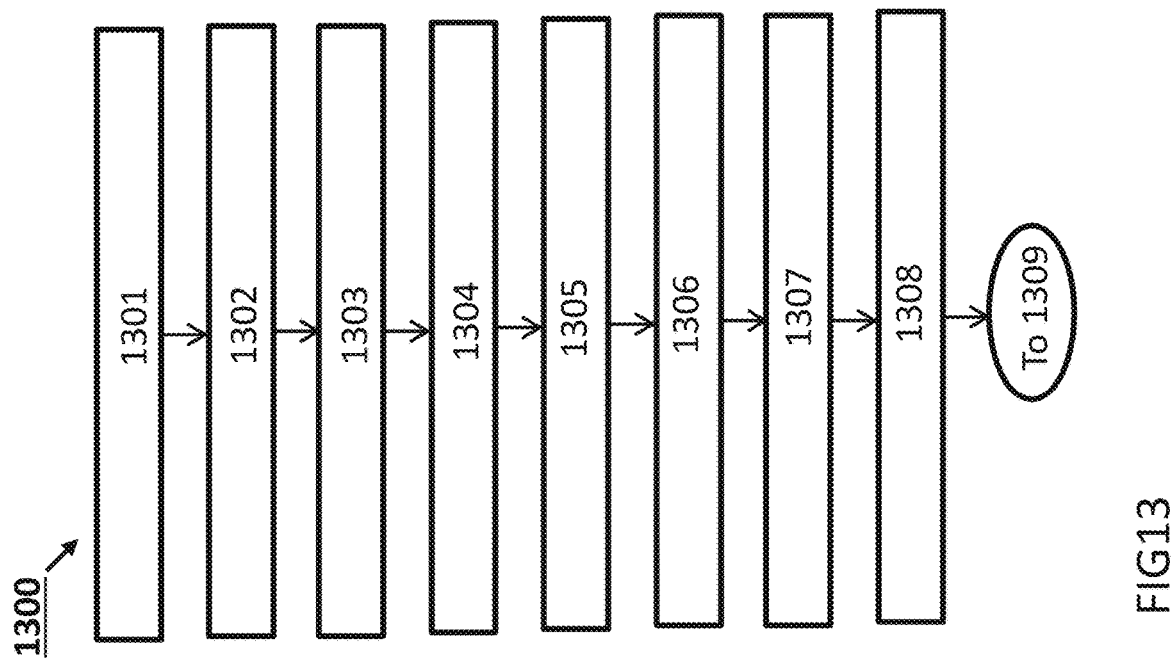
FIG 13

GEMOLOGICAL OBJECT RECOGNITION

TECHNICAL FIELD

This outstanding disclosure of claimed embodiments of the invention in general relates to systems and methods for recognition of objects and, more particularly, to such object as gemstones, as well as in raw, but especially in processed form. The disclosure relates also to the devices and system using such device in the object recognition accordingly, comprising an imaging device. The disclosure relates also to gemstone imaging in gemstone examination and a system for the examination.

BACKGROUND

Gemstones have been used in many ways. Basically in two main ways, as in jewelry industry for making jewels and in industrial applications, where in the latter for example diamonds are used in wear out resistant applications, such as bearings for example. Traditionally gemstones that have pure color, clear appearance and good optical quality, to deflect light with high refractive index, and/or mechanically intact structure with suitable color, have been highly valued in the jewelry industry. The purest diamonds for example are also used as investment instruments, to keep their value against monetary value variations. If the best gemstones do not have artifacts, such as cracks, bubbles or shadowing inclusions which could influence to the capability to deflect light, or make the gemstone opaque, the gemstones can be used in jewelry but also as instruments of investments. If the gemstones deflect by their quality requirements for the gemstone specific classification parameters in respect to the artifact tolerances, so much that they do not look as they should do or have more artifacts than allowed, the gemstones may be still used in an industrial task or a process.

Gemstones are often refined from the raw appearance by honing, for example to give them the appearance of a polyhedron or alike, or a diamond shape, having a crown and pavilion parts. If there were cracks somewhere in the structure, perhaps hiding as micro cracks, or there were such artifacts that prevent making the edges and/or cones in a desired way in the honing, it be may not worth of making all the work if the gemstone were about to turn out to be not valid for the purpose during the work or cracks in pieces during the work. Thus, it were useful, if the artifacts and other characteristic features of the object could be found before the expensive and tedious honing or other work phases. Sometimes color artifacts can be revealed by eye, but for example bubbles and cracks, especially micro cracks may be hiding so that a human inspector does not notice necessarily all such artifacts. Also the human capability to see from different angles visible cracks is good, but is exhausting with the long lasting sessions. In addition, the observation ability varies from an individual to another, and the evaluation may be not repeatable in a required tolerance. Consequently, observed changes in the structure between two evaluation sessions for a gemstone may be not revealed.

Gemstones as monetary valued instruments need to be recognized and their identity should be reliably enough to get confirmed. However, markets for example can be around the world and the sellers and buyers may be not willing to travel, just for inspection or to receive the certificate about an inspection about the targeted object to be recognized correctly. In addition a trend of the markets that the exchange of the merchandizes are sifting to the real-time, into e-commercialization.

SUMMARY

It is an object of the disclosure of the embodiments of the claimed invention to provide a method to recognize an object by an embodied object recognizing system comprising an imaging device and a moving assembly to move said imaging device of an imaging system and/or the object in respect to each other, to form a path around said object on an imaginary sphere, the method comprising at least one of the following:

predefining an imaginary sphere, to comprise the corresponding imaging locations to correspond said imaging device in the imaging, predefining an $\Phi$-direction increment on said imaginary sphere surface for the movement path of the imaging device to follow the imaginary sphere surface in a first imaging plane, predefining an $\Theta$-direction increment on said imaginary sphere surface for the movement of the imaging device to provide an effect as to follow the imaginary sphere surface in a second imaging plane, setting at least one starting position to said imaging device to start the imaging, collecting image and/or video data about the object from an imaging location into at least one image stack by an imaging device from an imaging location defined by the increments in $\Theta$-direction and $\Phi$-direction to follow the corresponding imaginary sphere location, storing images of at least one of said image stack corresponding the imaging location of the imaging device, for a virtual model of the object to be recognized, selecting a next imaging location for the imaging device to collect a next at least one image stack corresponding an incremental change of at least one of the $\Theta$-direction increment and/or the $\Phi$-direction increment, combing images from said at least one image stack with other images from said at least one image stack and/or from another similar at least one image stack for the virtual model of the object to be recognized, recognizing and recording measures of character of said object to be recognized from at least one of said images of an image stack, repeating image collection and selecting a next imaging location for the imaging device to collect a next at least one image stack corresponding an incremental change of at least one of the $\Theta$-direction increment and the $\Phi$-direction increment until all the predefined imaging locations of the moving assembly around said object to be recognized has been dealt, comparing the measures of character of the object to be recognized to those of objects in a database, giving an identity to said object to be recognized and to said virtual model of it, if no similarity of compared measures of character found from said database.

According to an embodiment the method comprises post processing of at least one of the obtained images and/or video frames. An imaging method according to an embodiment comprises imaging a target in illumination of radiation by a camera to obtain at least one image of the target in an image stack. According to an embodiment, the imaginary sphere locations can correspond in suitable part to the imaging location of the imaging device in duty, according to an embodiment variant $\Phi$-direction increments defined locations. According to an embodiment, the imaginary sphere imaging locations are defined by combinations of rotations of the object and/or the imaging device such as camera around the object.

An imaging system according to the present disclosure is presented in an independent claim directed to the imaging system.

An imaging system according to an embodiment of the disclosure comprises:
 camera,
 camera support to support the camera and facilitate a respective movement of the camera and the target to each other,
 base to hold the target and facilitate a respective movement of the target in respect to the camera and/or the camera support.

According to an embodiment the target is a gemstone to be examined as based on the imaging by the system. According to an embodiment, the imaging system comprises such a camera support and/or base that the imaging of the targeted object is made from predefined imaging angles representing imaging positions of a visual model. According to an embodiment, the imaging angles are defined before the actual imaging. According to an embodiment, the imaging angles are selected according to the radiation type selected. According to an embodiment, the imaging system comprises an embodied radiation source.

Some preferable embodiments of the invention are described in the dependent claims, and in embodiment examples in the text. Embodiments are combinable in suitable part.

Significant advantages can be achieved with the present invention. The need for a human inspector and/or operator is reduced to the minimum, for example, especially in the fully automated embodiments. The gemstones can be examined and/or classified, even so that the examining can be followed in a remote site being remote to the imaging site. The examination is not bound to the geographic location or time. Information network connection can be used between the sites. Machine vision can be used in suitable part in assistance of the examination and/or for the classification of the objects. The identity, given by the system embodied, can be authenticated according to embodiments. The presentation based on the system retrieved images can be authenticated according to the selected images or video frames in the control of the control unit.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A to 1H illustrate examples of system elements embodied, hardware and software in suitable part, FIGS. 13, 14 and 15 illustrate embodiments of the disclosure according to the method to recognize an object by an embodied object recognizing system.

Figure 1A:
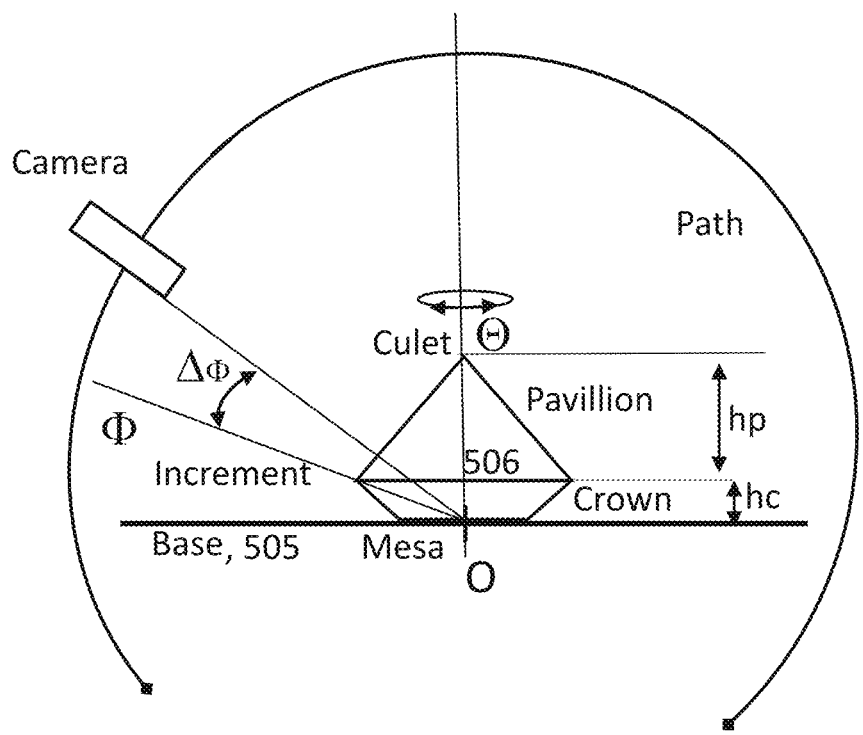

The above descriptions with reference to FIGS. are for purposes of illustration and are not meant to be limiting, not the dimensions, geometric ratios and/or their mutual relations, not only to that what is apparent from the shown examples. A skilled person in the field can scale the dimensions on the basis of the embodiments for further variants without leaving the scope of the claimed embodiments. Numerous other examples, configurations, processes, etc., may exist, some of which are described in a further detail below. Embodiments of the disclosure are combinable in suitable part. Example embodiments will now be described with reference to the accompanying figures.

DETAILED DESCRIPTION OF EXAMPLES OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. Example embodiments of the present disclosure relate to systems, methods, and devices for recording frames of an object to be recognized.

In one embodiment, the object of being recognized, is imaged by making a visual model about it by photographing the object by a camera, from positions corresponding around the object an imaginary sphere corresponding locations, so that the taken frames (by camera) form the visual model of the object to recognized in such a manner that the ensemble of the frames allow a user to observe, inspect and/or retrieve the object on-line and rotate and/or magnify the object and/or its measures of character and/or authenticity, in a manner to allow to give an e-certificate about the object to be recognized to a user at the user site.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication unit may include one or more processors and may be configured with instructions stored on a computer-readable storage device memory.

Examples, as described herein, may include or may operate on logic or a number of components, modules, or mechanisms. Modules are tangible entities (e.g., hardware) capable of performing specified operations when operating. A module can include hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units such as a microprocessor for example, to carry out a specific operation when in operation. The configuring may occur under the direction of the executions units or a loading mechanism. Accordingly, the execution units are communicatively coupled to the computer-readable medium when the device is operating. Although the FIGS. are showing some examples on embodiments, it is not intended to limit the dimensions, geometric ratios and/or their mutual relations only to the shown examples used in the Figs. A skilled person in the field can scale dimensions based on the embodiments for further variants without leaving the scope of the claimed embodiments. Embodiments of the invention are combinable in suitable part.

Figure 1B:
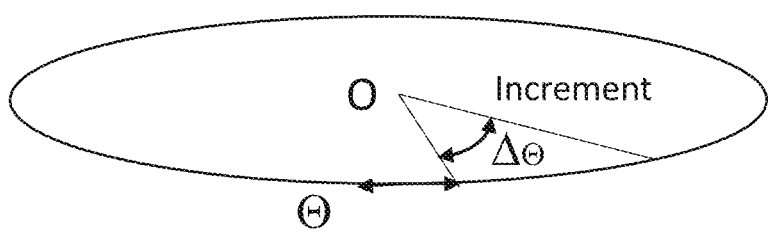
Figure 9:
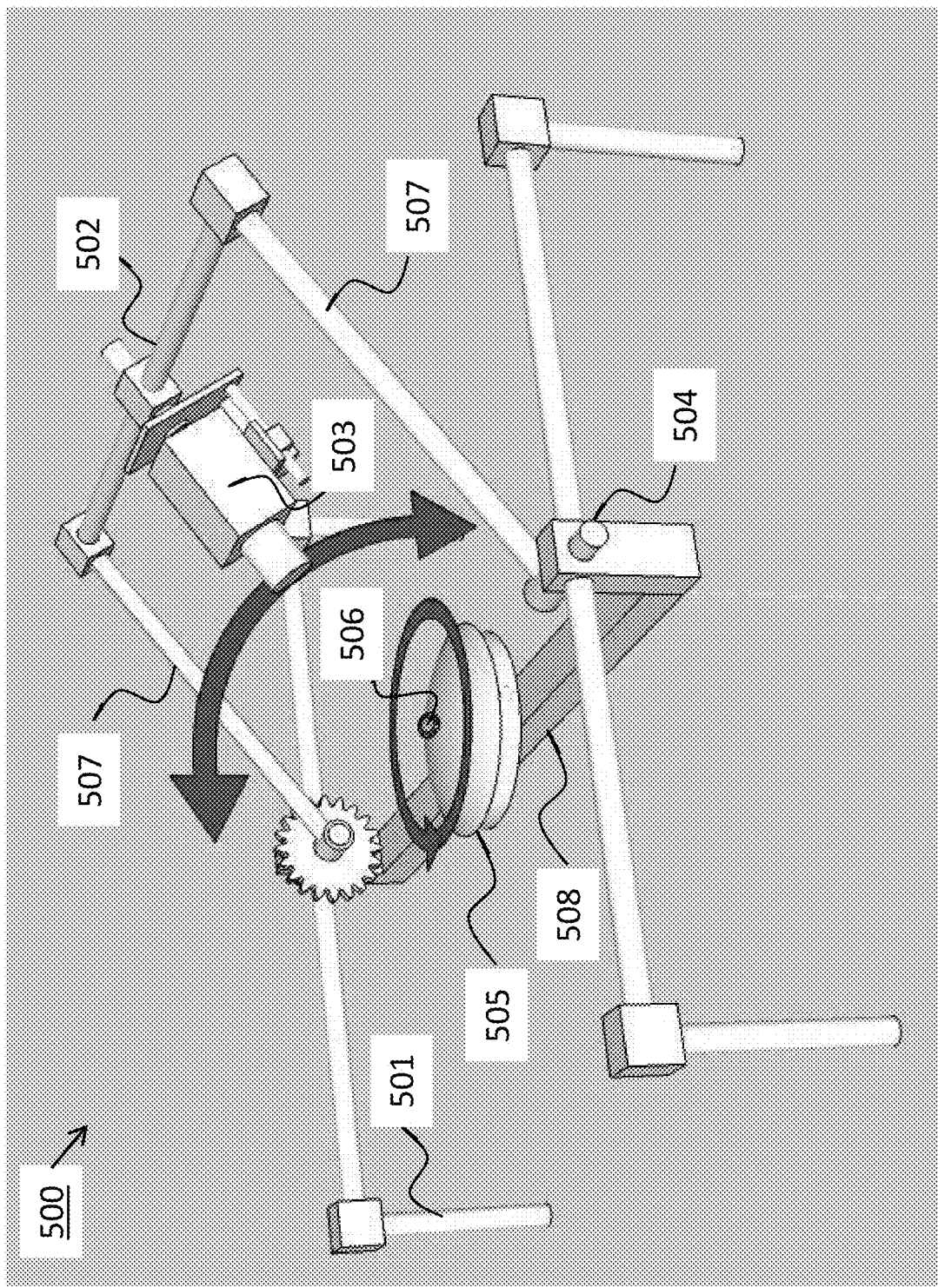
FIG. 9 illustrates an imaging system example according to an embodiment, wherein the embodied imaging system comprises at least a camera, a camera boom and base. The camera boom is arranged rotatable over the base, the base rotates 360 degrees. Gemstones are set on the base and no further securing is needed in the example.

FIG. 1A depicts a schematic illustrating an example of a system parts as piece of hardware using a camera as an imaging device to take images and/or video frames from the object to be recognized on a base. The camera can rotate along an exemplified path in the $\Phi$-direction with incremental ($\Delta\Phi$) position movements. FIG. 9 gives a further example of an embodied implementation example. The object to be recognized has been embodied as a diamond-shaped gemstone with the crown (height hc), pavilion (height hp), culet and mesa, the mesa part of the object being drawn as on the base, illustrated by the line. The object being enabled to get rotated in the $\Theta$-directions in a plane incrementally ($\Delta\Theta$) as illustrated in FIG. 1B. The rotation and the camera movement can be implemented so that the images and/or video frames would form such an effect that the images and video frames would have been taken from an imaginary sphere or dome surface around the object.

Figure 1C:
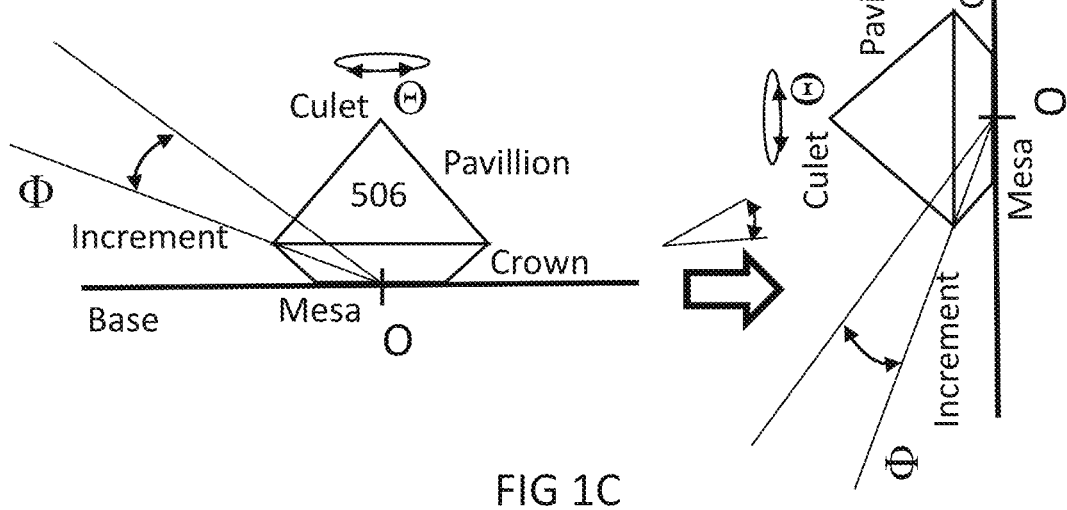

FIG. 1C depicts a schematic illustrating tilting of the base in an embodiment, so that the camera path could be also embodied as in FIG. 1A, but by constant path, but in an enabling manner to produce paths in inclined planes in the object-centered coordinate system for the dome.

FIG. 1D depicts an illustrative manner coordinate systems such as Spherical (Sph), Cylindrical (Cyl) and Cartesian (Car) coordinate systems. The arrows Tr1, Tr2 and Tr3 illustrate coordinate transformations from one coordinate system to another. The opposite direction pointing near-arrows illustrate the respective inverse transformations (Tr1$^{-1}$, Tr2$^{-1}$, Tr3$^{-1}$). In addition to the coordinate systems, the FIG. 1D illustrates also respective optional illumination geometries to illuminate accordingly the object to be recognized. This is also used in the FIG. 1G, to show the geometries for diffuse illumination through the opaque screens respectively following the geometry in the FIG. 1G indicated by the dashed lines. According to an embodiment, Tr1 and Tr1$^{-1}$, with reference to FIG. 1D, are considered between a cylindrical and a spherical coordinate of an arbitrary point P transformations: Tr1: P($\Theta$,r,h)$\Rightarrow$P($\Theta$,$\Phi$,r) and inversely the Tr1$^{-1}$ P($\Theta$,$\Phi$,r)$\Rightarrow$P($\Theta$,r,h). According to an embodiment transformations Tr2 and Tr2$^{-1}$ are considered between a Cartesian and a cylindrical coordinate of the point P transformations: Tr2: P(x,y,z)$\Rightarrow$P($\Theta$,r,h) and Tr2$^{-1}$: P($\Theta$,r,h)$\Rightarrow$P(x,y,z). According to an embodiment transformations Tr3 and Tr3$^{-1}$ are between a Cartesian and a spherical coordinate of the point P transformations: Tr3: P(x,y,z)$\Rightarrow$P($\Theta$,$\Phi$,r) and Tr3$^{-1}$: P($\Theta$,$\Phi$,r)$\Rightarrow$P(x,y,z). The symbols r denotes to radius and h to height coordinate. Particularly in spherical or a dome or part thereof, the r can be considered as the camera distance from the object to be recognized. Transformations can be used in image corrections where applicable in suitable part, even so that image distortions, origo mismatch, translatory discrepancies etc. can be corrected inside a same coordinate system, (i.e. from Spherical to Spherical or from Spherical to Cartesian, for example), when needed. The transformation can be made by a computer, in a microprocessor belonging in to the system, as well as the increment calculations and/or transformations relating to such where needed.

FIG. 1E depicts an illustrative manner an object holder, the object to be held in the illumination chamber as in FIG. 1G with an embodied geometry. The object is positioned between the plates, plate1 and plate2 so that the inclined plate1 holds the object in the position. The plates can be made of transparent material, and could be coated in suitable part against scratches. Examples of suitable materials can be boron nitride and/or DLC with over 90% of sp3 orbital structured bonds between the carbon atoms. In an embodiment example, the base has means for damping vibrations, passively by shock absorption means, in another variant a transducer for active damping in counter phase, in suitable part in addition or alternative, to produce counter-phased vibrations. The base can be also tilted in suitable part in respect of the chassis (FIG. 1G), and/or the base can be rotated. The base can be in an embodied system. The system can tilt and/or rotate the base and/or the object in suitable part for different kind of paths of the camera in respect to the object, in the control of the control unit.

In FIG. 1F an object to be recognized is illustrated as such on a base. In this optional embodiment the object can be in a different starting position than in the FIG. 1E. The base can be in an embodied system. The system can tilt and/or rotate the base and/or the object in suitable part.

In FIG. 1G the imaging device is embodied with the camera that is illustrated to be schematically connected to an arm (as seen above, illustrated by a black dot), to facilitate the movement along the path (cf. FIG. 1A for example, and FIG. 9 alternatives) around the object. The camera is positioned so that it illustrates taking frames, images and/or video, so that there can be also the background Bgrnd in suitable part. The background can be chosen to dark, gray, colored otherwise or white, to enhance the contrast of the object's visual appearance, and/or to distinguish the measures of character of the object. The object and the background can be embodied to tilt together in an embodiment variant. The object can be on a base according to the disclosure (i.e. as in FIG. 1E, 1F, 1H, for example, also as in FIG. 9), positioned on chassis holding the whole system with the base. The camera can be connected to the measurement device MD as illustrated by the line between the rectangle surrounding the embodied parts therein and the camera. The rectangle can be functionally connected to the chassis, camera and to the arm for the controls thereof in an example of an embodiment. According to an embodiment, the measurement device MD can comprise control unit Contr arranged to control the operations of the measurement device, for example, in the control of the microprocessor µP, which also can be used to collect the images and/or video frames into the memory Mem that can comprise in suitable part volatile and/or permanent memory. Microprocessor also is responsible to authenticate the frames by using authentication means AuthG to generate authentication tag to the suitably predefined frames to form an authentication code for the virtual model of the object to be recognized. The pictorial data formed from the frames is embodied being stored into the database DB that is exemplified as an internal database to the system. However, in suitable part the pictorial data of the virtual model can be also communicated to external databases Ext DB in suitable part by the communication means Com, arranged to communicate with the user via a user interphase and/or to communicate between suitable system elements, such as the control unit. The other system parts such as motor drivers (Servo) and sensing elements (Sense) can provide data to the microprocessor for the frames, i.e. position etc. The data so exemplified can be in suitable part stored to the memory, to the local database, and/or to the remote, external database, Ext DB. According to an embodiment at least one of the databases, (Ext DB for example and/or Memory Mem can be embodied by a cloud. The ADC DAC element in the system is used in digital conversions between analog and digital signals, in measurements and/or in control commands. Robo is illustrative of a control means to control an industrial robot to be used as a manipulator to handle object to the chamber, on to the base and back to the depository of the objects, gemstones according to an embodiment, etc mechanical operations and/or position changes.

The authentication generator AuthG as such can provide authentication tags to the frames in the control of the microprocessor and an algorithm to control the measurement and/or the object recognition in the embodiments in suitable part. The authentication generator can produce tags according to a known algorithm as such to produce a number queues as such, from a suitable starting number to suitable ending number for the tag frames, for example. The so formed code, authentication code (Auth code) can be communicated via the communication means also in suitable part to the external database for example, so that a similar generator can dismantle the code from the meant frames and recognize the virtual model to be an authentic from the communicated authentication code, or its preselected parts for the recognition. The coding can vary according to a predefined scheme as such as used in the network protocols in the communications used. The number queues for the tags can be cumulative built so that the next number in queue is a sum of the previous two formers, for example, and/or cumulative in such a manner that all the numbers are summed for the next number. A skilled person knows based on the embodiments, when read and understood many ways to implement the tags. According to an embodiment, the AuthG can calculate also the location of the frames that are to be provided with the tag, according to the same queue for an embodiment variant, but according to another variant from a different number queue. The number queues can be communicated between the producing site and reading site in a coded and/or secrete form, over the used media, i.e. an information network, so that the authentication can be proven when exists. Authentication code can be communicated via secure channel between the communications sites.

Servo illustrates hardware (and software built in suitable part) to drive the arm and the camera along the path around the object, but also to drive the tilting and/or rotation of the base, so that the increments $\Delta\Theta$ and $\Delta\Phi$ can map the imaginary sphere locations to provide the view to the object to be recognized as viewed from the camera distance, corresponding the imaginary sphere, in an object recognition event, in recordings and/or retrievals.

Sense illustrates sensors means (and software built in suitable part), to measure the ambient conditions of temperature, pressure, humidity, lighting, but also in suitable part pressure of grasp of the robot and/or weight of the object, as well as to take part in measuring electric fields, with respective measuring means for, magnetic fluxes, gas flows, acoustic frequencies, and/or gas pressures, in a maintaining loop and/or adjustment of the conditions in an object recognition event, in recordings and/or retrievals.

MV illustrates Mechanical Vibration damping system controller to control the damping system embodied that can be based in suitable part in passive layers in the base to absorb shocks in an embodiment, but in another embodiment in suitable part active transducers in the base to produce counter-phased vibrations to cancel the mechanical vibrations.

The FIG. 1H illustrates such a base that holds the object in a levitated position, as based on a force field F to cancel the weight of the object G. In an embodiment the force field F can be based on electric field, to combine static and/or dynamic fields to counter-balance the gravity. The force field component F can be produced by the transducer Tf, as being connected to a suitable source, such as a voltage source for example to produce the force field component. The same Tf symbol also illustrates magnetic field based transducer to produce a magnetic field to contribute to the levitation effect. According to an embodiment the transducer can in addition or alternative being used to produce flow to utilize Bernoulli-principle to hold the object in the flow. According to an embodiment variant, the transducer Tf can comprise also in suitable extent an acoustic means to make the object levitate in an acoustic ultrasound filed.

In FIG. 1H the force field components R1, R2, R3 and R4 illustrate radial force components in the cross sectional scheme of FIG. 1H. The radial components can be produced by the ring-type transducer T to center the object to the ring center, that is in such an embodiment also the center of the imaginary sphere of the camera path, so being to minimize needs for the corrections in the imaging, so saving processor time in the image processing.

Figure 2A:
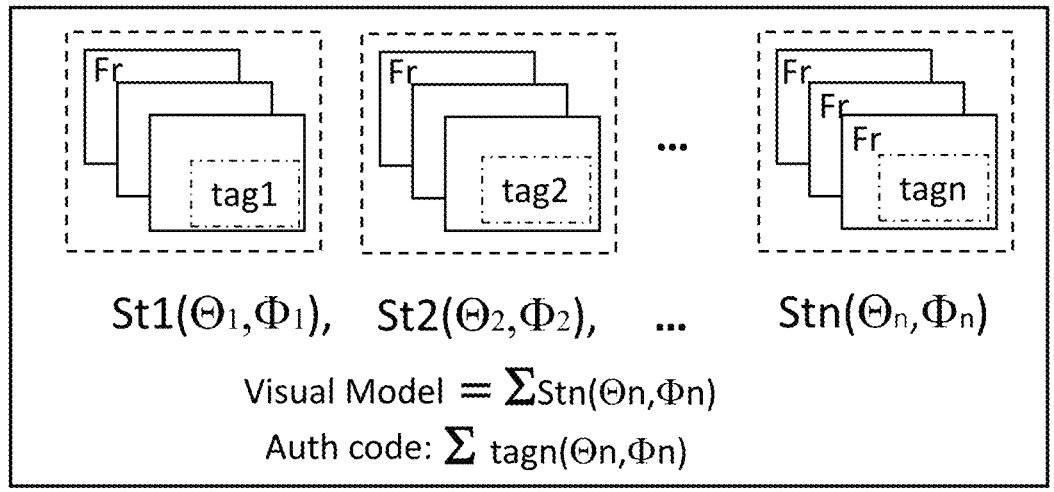
FIGS. 2A and 2B illustrate example embodiments of information of a visual model.

FIG. 2A illustrates the visual model of the object to be recognized as a composition of images and/or video frames. Images and frames are illustrated by Fr, being taken from a position defined by the incremental positions of the path on the imaginary sphere ($\Theta_n$, $\Phi_n$) locations, so that each location n, a stack ($St_1$, $St_2$ . . . . $St_n$) of frames (Fr) has been recorded by the camera, so that there is at least one frame Fr in each stack $St_n$ corresponding the location so that they surround the object to be recognized by the frames. The dashed line rectangles tag1, tag2 and tagn illustrate tags on such frames that have been provided with the corresponding authentication tag. The tags form an authentication code, being formed in the control of the microprocessor in FIG. 1G, by the authentication generator AuthG, and the related algorithm to produce authentication code. Although the example in FIG. 2A is indicative that the authentication code for the virtual model can be formed from the composition of the tags (1, 2, . . . n for the position in the stacks) (indicated by the sigma-character), also pre-determined parts of the ensemble of the tags can be used to form the authentication code as such. If needed, the exemplified transformations of FIG. 1D can be used between transformations of various coordinate systems.

Figure 2B:
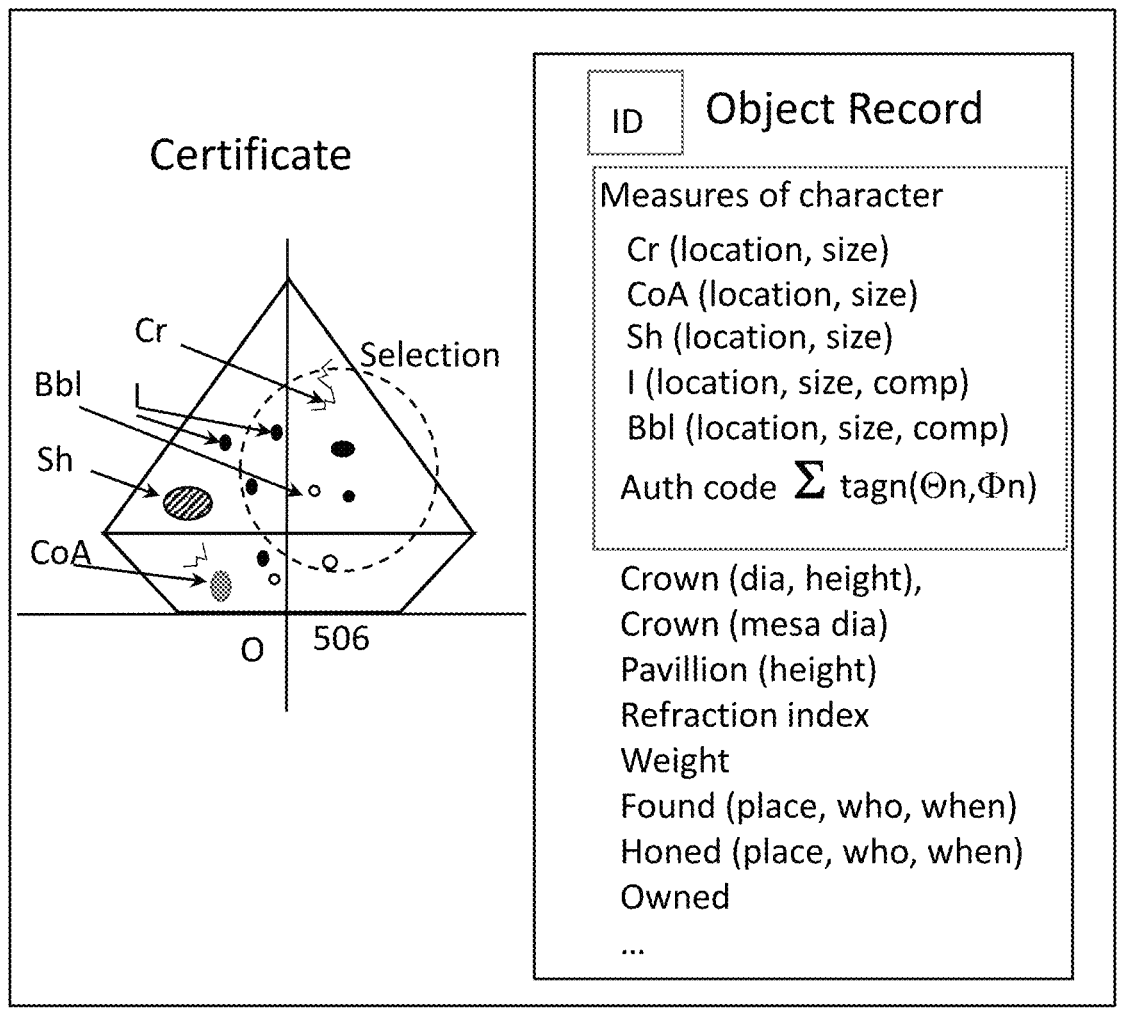

FIG. 2B illustrates example about information of a visual model in a file about the object to be recognized as collected and/or as read for retrieval by a user. According to an embodiment the information can comprise such measures of character as cracks Cr, Color Anomalies CoA, shadows Sh, inclusions I, bubles Bbl, and/or other features that can be observable from the frames taken around the object to be recognized from the positions to correspond the imaginary sphere. The measures of characters can be used in suitable part as measures of authentication in suitable part, if not all are so considered. The measures of character (and/or as used as measures of authentication of inbound origin) can be shown with their location and measured size, and/or where applicable also with composition.

According to an embodiment, an authentication code can be shown in such a mode that a remote user can also recognize the authentication status, although the authentication code as such in an explicit mode and/or the tagged frames as such were not used to be shown to the user. The authentication code as such also confirms with the measures of authentication of inbound origin that a gemstone as such as an object to be recognized is an authentic object. According to an embodiment, measures of authenticity can include also the authentication code. According to an embodiment, authentication code and/or other measures of authenticity can be partly, in suitable part, communicated to a remote user, so that the remaining measures not yet being communicated can be reserved for purposes of further verification of the user and/or site in the communication loop between the parties involved in the retrieval. Also geometric measures, for a gemstone as such, as Crown (diameter, height), Crown (mesa, dia), Pavilion (height), Refraction index, Weight, Found (place, who, when), Honed (place, who, when), Owned, and/or repository location can be recorded and/or shown to a user. The object record (FIG. 2B) can form an electric Certificate in suitable part of the shown information.

According to an embodiment a user can graphically make a selection as based on the measures of authentication on a certain range on the object to be recognized, in the example of FIG. 2B a diamond, the selection being indicated by the circular dashed line. According to an embodiment the user has found from the data bases such a diamond that has in the selected area/volume four inclusions (black dots) and two bubles (hollow circles). The diamond has also outside the area a shadowed volume Sh, and a crack Cr extending to the selected area, and another crack outside the selection. There is also a color anomaly CoA outside the selection and some inclusions, and a bubble outside the selection. According to an embodiment the size of the measures of authentication can be user selectable for the size to be included into the retrieval, if not all those that which have been recognized in the frames were not wanted to be considered in the retrieval and/or for the certificate.

Figure 3:
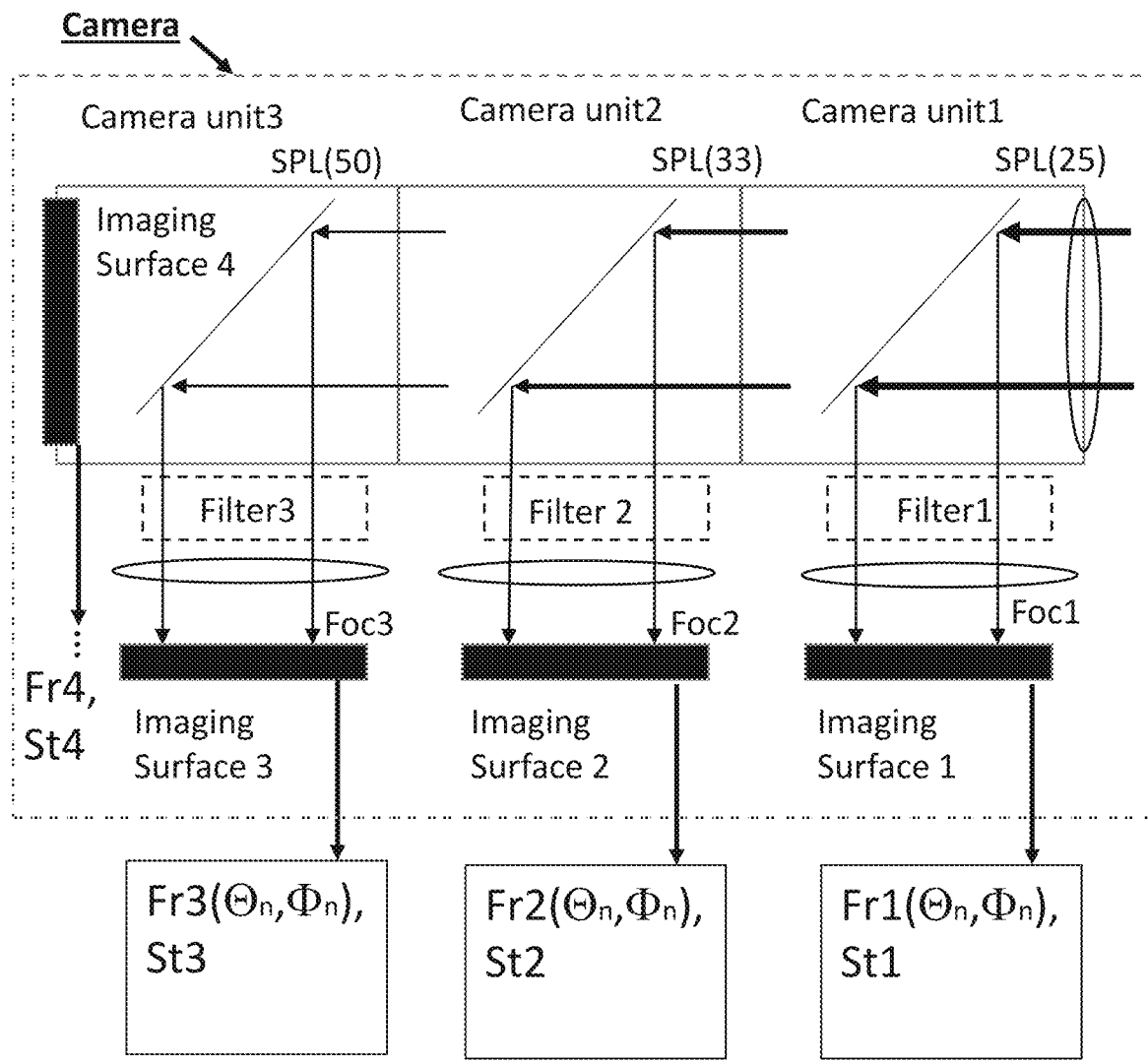
FIG. 3 illustrates an example embodiment of camera as a piece of hardware as a system element.

FIG. 3 illustrates a scheme of an example of a camera comprising three camera units (camera unit 1, camera unit 2, and camera unit 3). The camera unit 3 is a double camera unit having in this example two imaging surfaces (imaging surface 3 and imaging surface 4). The camera unit 1 and camera unit 2 have respective imaging surfaces 1 and 2, to be used in recording the frames into the corresponding frame-stacks St1, St2, St3 and St4. Each of the camera units can be focused to its own focal plane in the object to be recognized. The additional focal planes are indicated with a lens-shaped symbol with the corresponding focus reference Foc1, Foc2 and Foc3 referring to the respective camera unit and the focal plane according to the indicated number. According to an embodiment variant, the camera units can have each a filter (optionality indicated by the dashed lines), so that the camera unit can pick certain ranges of the illumination wave lengths to the images at the focal plane of the camera unit. The filters can be passive units in suitable part, but according to an embodiment, can comprise for example an etalon-based structure to pass a certain wavelength range of the illumination to the imaging surface, according to a further variant in a controllable manner by the control unit (FIG. 1G). The SPL (%%)-objects are indicative of splitting the incoming illumination with the number indicated percentage. For example, SPL(25) mirrors 25% of the illumination to the imaging surface 1, via the filter 1, at the focus Foc1 focused to the corresponding focal plane in the object to be recognized. SPL(33) mirrors 33% of the illumination to the imaging surface 2, via the filter 2, at the focus Foc2 focused to the corresponding focal plane in the object to be recognized. SPL(50) mirrors 50% of the illumination to the imaging surface 3 via the filter 3 at the focus Foc3 focused to the corresponding focal plane in the object to be recognized. The rest of the illumination coming to the camera is received by the imaging surface 4. Although any further filter not shown, a skilled person in the art understands that the illumination can be also filtered in suitable part in an embodiment variant.

According to a further embodiment variant, the focus of the camera to produce focal depth in the object can be varied so that a single camera unit can be used to produce an ensemble of corresponding frame stacks with varying focal point with the corresponding focal plane in the object to be recognized at a camera location $(\Theta_n, \Phi_n)$.

Figure 4:
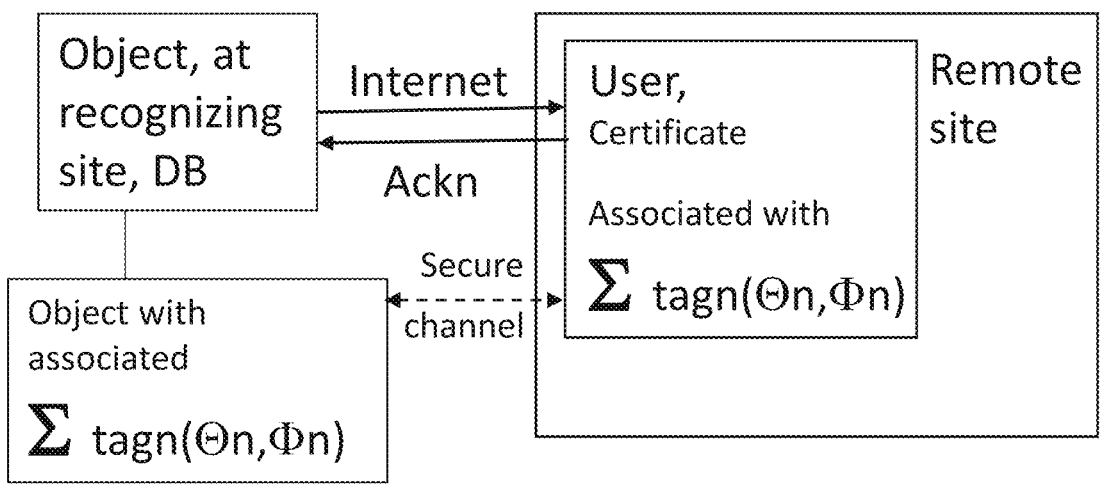
FIG. 4 illustrates authentication recognition in an example embodiment.
Figure 5:
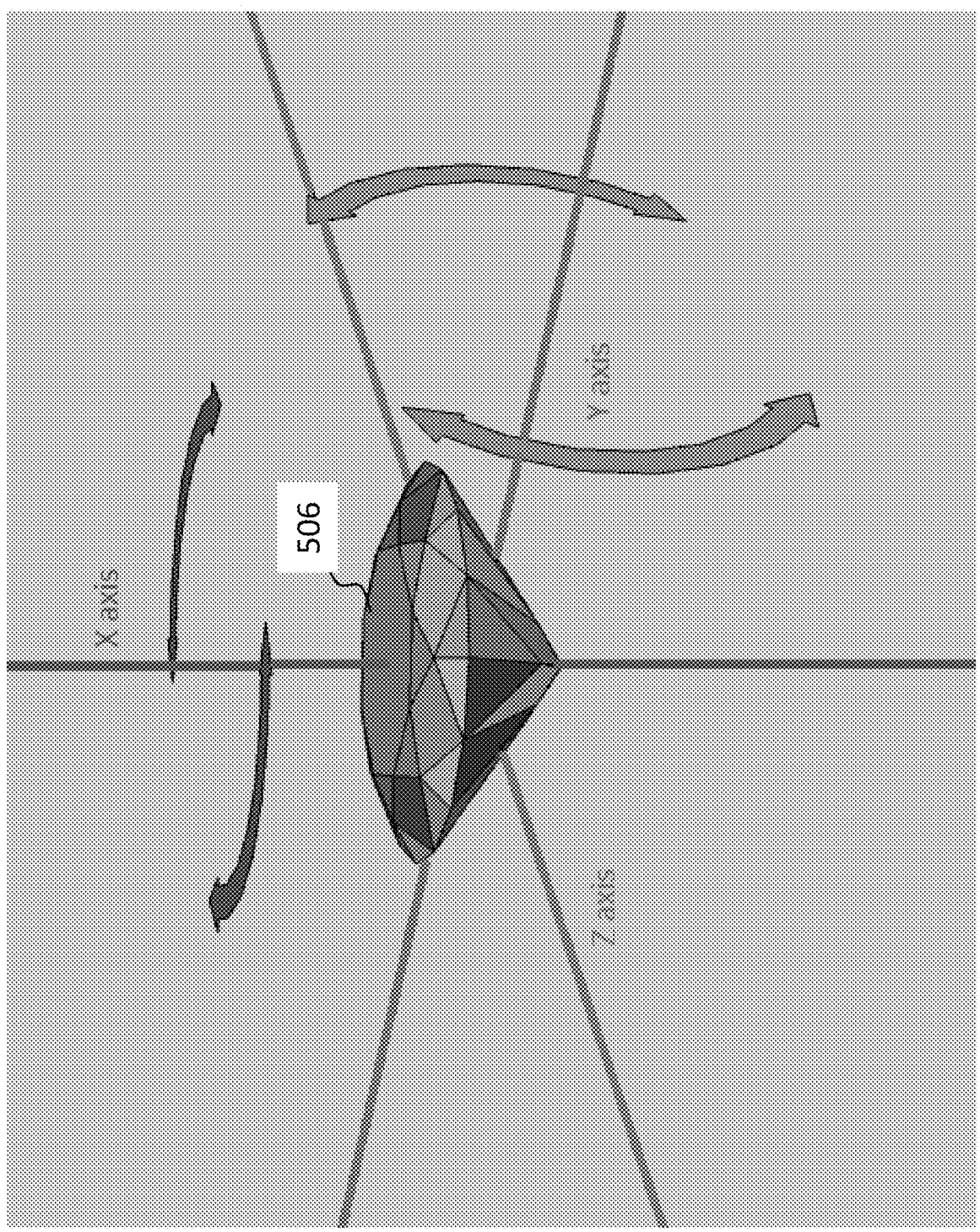
FIG. 5 illustrates an example of gemstone x-y imaging angles in relation to X-Y axes.

FIG. 4 illustrates recognition of authenticity of an object at a remote site via a user given certificate. The certificate has been given about an object to be recognized at a recognizing site, as based on the information in the database DB, the visual model being formed from the object with an associated authentication code $\Sigma\ tag_n(\Theta_n, \Phi_n)$. The remote site, being able to recognize the code and the tag locations and the tag values, can then acknowledge (Ackn) the recognition site via a communications network, such as an Internet, for example, that the visual model was received and stated to be authenticated correctly so that an e-certificate could have been formed. According to an embodiment, the authentication code can be communicated between the sites in a secure channel, and/or as encrypted.

In the examples referring to the FIGS. 5 to 8, they are using a Cartesian coordinate type of notation when referring to the planes of camera path in the recordings of the frames, with a solution based on an embodied system, non-secured gemstones can be photographed thoroughly without any visible attachments. According to an embodiment, it is based on predefined X-Y axes of the gemstone, predefined gemstone x-y imaging angles based on these axes and/or calculating needed camera angle to position the camera on a gemstone imaging angle. The coordinates can be transformed as illustrated by the FIG. 1D.

According to an embodiment, the gemstone's X-Y axes are defined a. X-axis is perpendicular to the gemstone's tablet, a mesa, (as illustrated for an example in FIG. 1)

b. according to an embodiment, Y-axis is perpendicular to the X-axis and in alignment with a marker. According to an embodiment the marker can be at least one of the following:

a character of authenticity, a chosen edge of the gemstone, which position is controlled throughout the photography process, some visible feature of the gemstone and external marker, e.g. UV-pen which is then detected in UV-light.

According to an embodiment, also a temporary thermal hot point can be used as a marker, being made and/or maintained by a suitable laser for example to be used for making such, that is about to cool down by its own, without any trace or damage after the process of imaging. However, for repeatability such a marker can be made in respect to a feature of the gemstone for a re-imaging.

Figure 6:
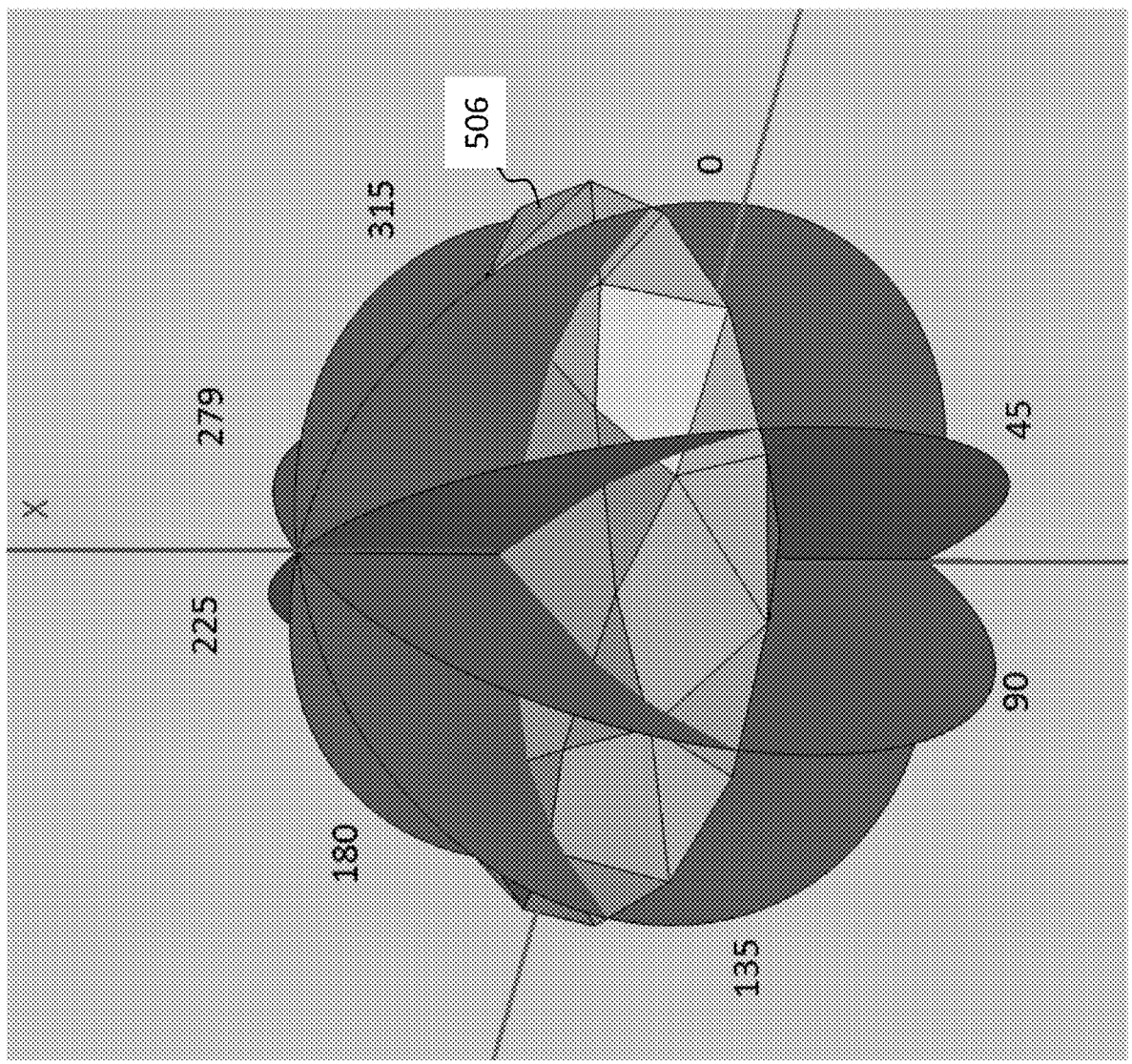
FIG. 6 illustrates an example of gemstone x 360 imaging angles are based on X-axis. 0 point is on the Y axis.

FIG. 6 embodies an example according to which there are shown by the numbers angles in degrees for planes of camera paths (imaging paths) in combination to base positions, according to which an imaging is made for example. The shown degree values between 0 and 360 are not limiting the imaging used planes only to the shown values (0, 45, 90, 135, 180, 225, 279, 315). Gemstone 506 as an object to be imaged and also recognized (in the middle)×360 imaging angles are based on X axis. 0 point is on the Y axis. The X-axis is common in the example to the planes. Also other angles can be used in the increment formations according to the coordinate system in use.

Figure 7:
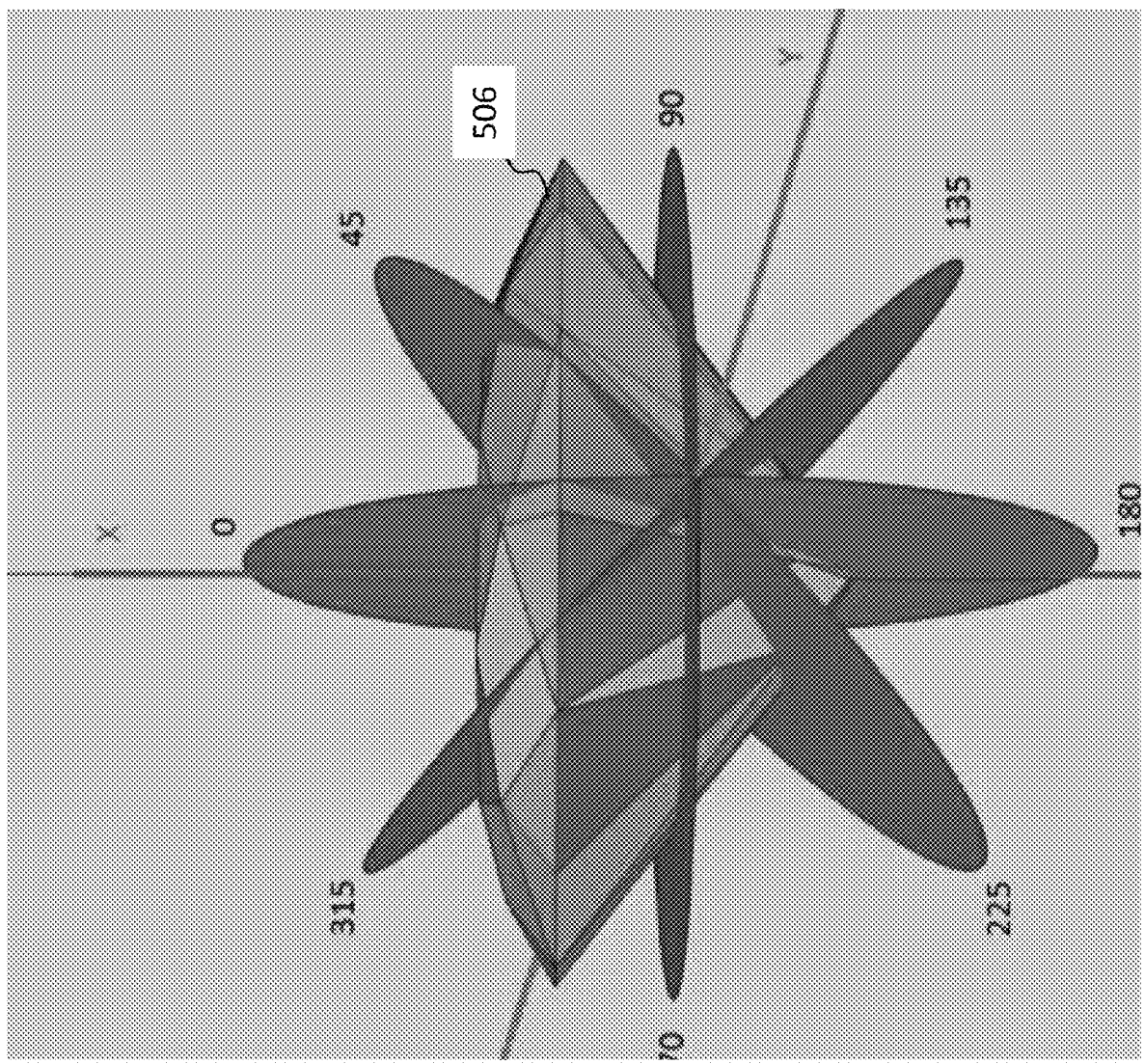
FIG. 7 illustrates an example of gemstone y 360 imaging angles are based on Y-axis. 0 point is on the X axis.

FIG. 7 embodies an example according to which there are shown by the numbers angles in degrees for planes of camera paths (imaging paths) in combination to base positions, according to which an imaging can be made. The shown degree values between 0 and 360 are not limiting the imaging used planes only to the shown values (0, 45, 90, 135, 180, 225, 279, 315). Gemstone 506 as an object to be imaged and also recognized (in the middle)×360 imaging angles are based on Y axis. 0 point is on the X axis. The Y-axis is common in the example to the planes.

Figure 8:
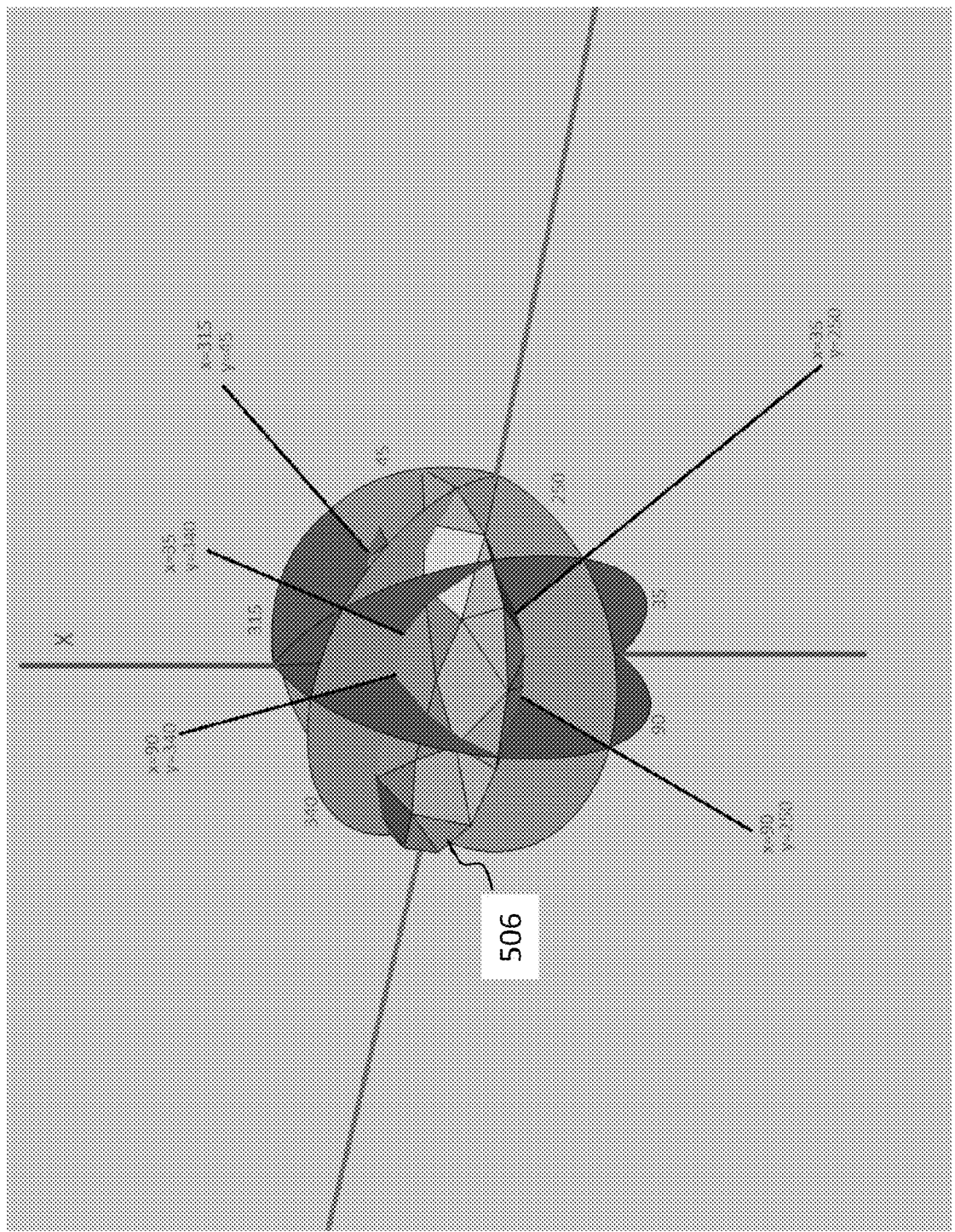
FIG. 8 illustrates an example of gemstone x-y imaging angles of x=35/y=250; x=90/y=250; x=90/y=340; x=35/y=340 and x=315/y=45.

In FIG. 8 example, gemstone x-y imaging angles of x=35/y=250; x=90/y=250; x=90/y=340; x=35/y=340 and x=315/y=45 were used to define the planes of camera paths (imaging paths) in combination to base positions. According to an embodiment, for example only five different gemstones imaging angles were presented in FIG. 8. In practice, the imaging angles are defined in an embodiment in 2 or 4-degree increments ($\Delta\Theta$, $\Delta\Phi$, cf FIGS. 1a and 1b) to capture gemstone movement accurately enough in respect to the imaging camera. This results in 4096 or 16 200 total images per single gemstone.

In FIG. 9, an embodied imaging system 500 device example in terms of hardware of moving assembly has been illustrated as an example. The system device is supported by a support 501 to the ground surface or the chassis of the system. Although a two-beam four-leg support is embodied in the example, it is not intended to limit the support only to the shown example. To the support 501 there is connected a beam 508 by a joint 504 that is such a joint that facilitates rotation of a second beam, a camera supporting beam 507 to pivot in a plane defined by the movement path of the pivoting. Examples in suitable part for illustration are shown in FIGS. 6 to 8. The camera 503 is attached to the camera boom 502 acting as an arm, between the beams 507, so that the position of the camera can be moved. According to an embodiment the parts part 505, part 508, part 504, part 507 and the camera 503 dimensions set an example of a value to the distance r from the gemstone 506 for the imaginary sphere. Although a straight camera boom 502 has been given as an example, it is also possible to use curved geometry, for the camera beam 502 but also for the beams 507 so that the camera position can be moved according to the curved path along the camera boom 502, thus providing accordingly an alternating distance to the gemstone 506. The camera 503 can be embodied so that it has 3D-rotation facilities at the attachment assembly to the camera boom 502, to point to the target 506, which in this example is embodied as a gemstone 506, for example an emerald, but is not limited only to the named type of gemstone. The gemstone 506 is positioned on the base 505, which is arranged to rotate to any position of a circular path as illustrated by the arrow in the plane, as explained also in accordance of FIG. 1B.

The base 505 is shown as to be positioned on the beam 508 so that the pivotable joint 504 and the beam 508 facilitate the camera 503 to point to the middle of the base 505 positioned gemstone 506 for imaging for taking frames. According to an embodiment, the movements can be made by suitable electromechanical actuators, such as for example motors and/or sprocket wheels to be used in the positioning. These means for the positioning can be controlled by a computer by electrical control signals in a control of a control unit. The system can also comprise necessary switches and/or position detectors to facilitate monitoring of the path when recording/taking the frames, in accordance of the control signals, but also for making a log on the imaging of the gemstone 506 individual, to be recorded for the visual model of such an object to be recognized.

A robot that can be used in the embodiments as a manipulator for the feeding the base and/or exiting the gemstone as such, but is not shown in the FIG. 9. According to an embodiment example a mechanical hand with few fingers can be used for the purpose. According to an embodiment the imaging, the gemstone set and take-outs are synchronized with the camera movement start and/or stop by the computer controlling the system. According to an embodiment illumination being used and/or controlled, can be implemented via the base 505 in suitable part, to hold the gemstone as the object to be recognized, but also other options to provide an embodied radiation for the illumination can be used in accordance of the examples.

Figure 10:
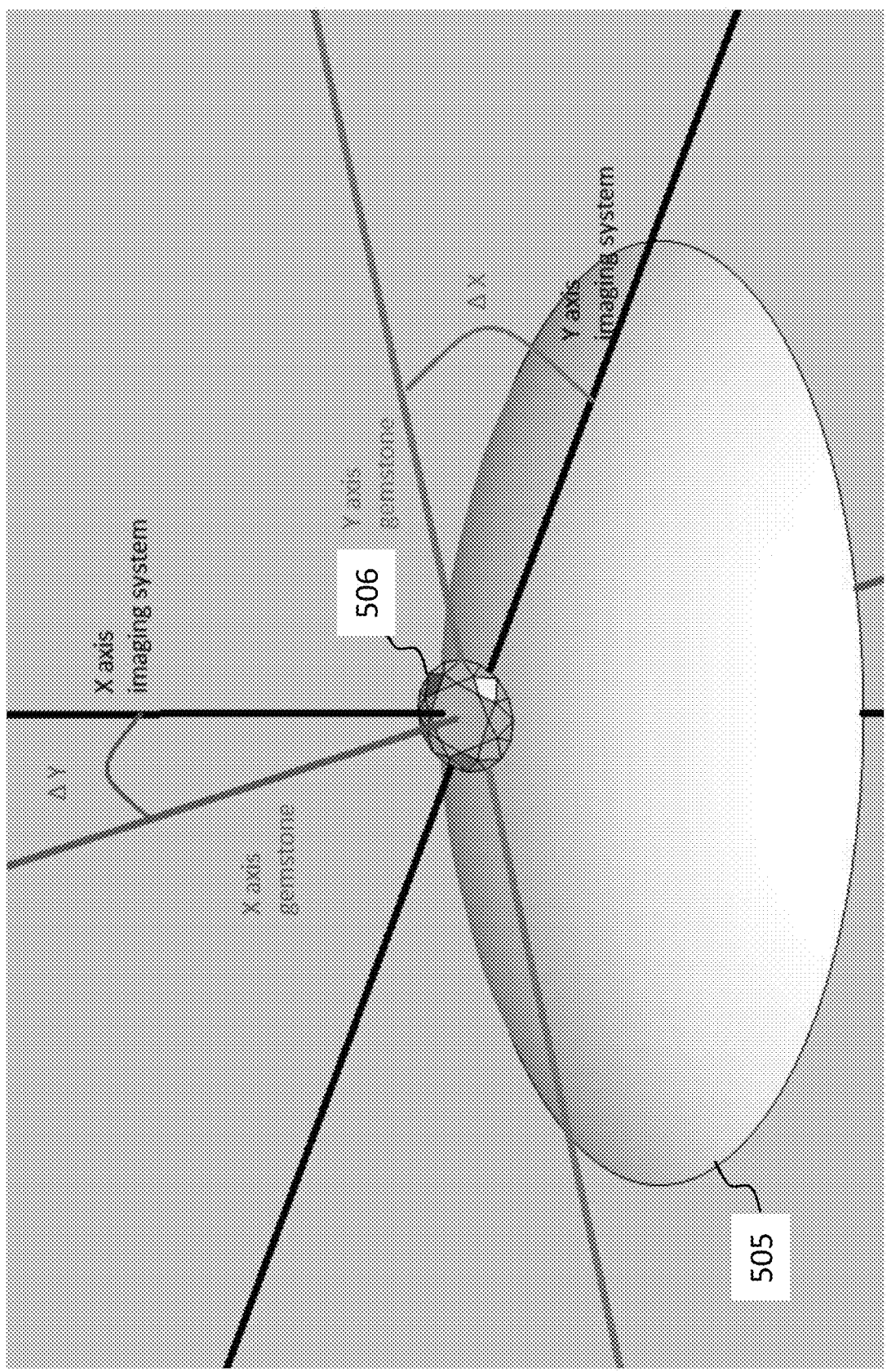
FIG. 10 illustrates predefining increments for range of imaging angles according to an embodiment.

In FIG. 10 there is illustrated a gemstone 506 on the base 505. The FIG. illustrates by the non-limiting examples $\Delta X$ and $\Delta Y$ (according to the Cartesian notation, which can be transformed to other coordinate system with the coordinate system compatible increments) the imaging system axis in such a case that they differ from the corresponding axis of the gemstone 506, that is tilted in respect to the Cartesian axis. According to an embodiment the method can comprise a transformation step in which the tilt is straightened. However, the same symbols also illustrate in a schematic way such embodiments that make the imaging in a stepwise manner to increment the photographing angles by the $\Delta$s. Although $\Delta$—symbol used for both X and Y-axis, the increments need not to be necessarily the same for the incrementing of the imaging positions of the predefined angles.

Figure 11:
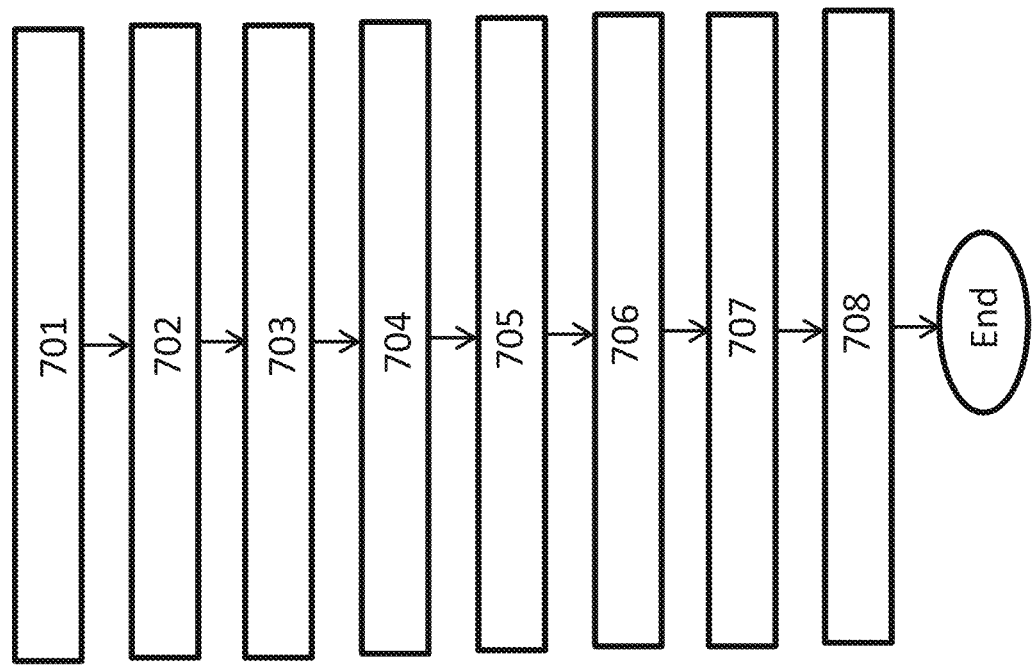

According to an embodiment, before taking image frames, the tilt of gemstone is measured as illustrated in FIG. 10. In an embodied method (FIG. 11) according to an optional imaging method, the imaging system checks 701 for the further operations embodied according to the method 1300 (FIG. 13) for example:

if the predefined gemstone-imaging angle is possible in terms of limitation to the camera boom 502 (FIG. 10):

if not, then this gemstone-imaging angle is saved for next gemstone position, if possible, the camera boom 502 and/or the base 505 are rotated 702 in respect to each other, according to an embodiment variant, by moving at least one of the following: the camera, gemstone holder, gemstone, and a mirror (according to an embodiment variant a pivotable mirror for optical path provision for the camera) in the system provided for dead-angle-inspection, the camera holder mechanics in suitable part, according to set the camera 503 on that gemstone-imaging angle, for each image (Fr) taken the amount of rotation is also calculated 703 for image post processing (708): with the rotation, the gemstone is "straightened" so that it looks like the gemstone has been in straight position during the photography, when all the possible predefined imaging angles, in respect to the predefined scheme of imaging, have been completed as predefined, the holding mechanisms of the gemstone and/or camera holding mechanism with the boom, the gemstone position is changed 704 in respect to the camera and its ΔX and ΔY are measured again, (the X-Y notation referring to Cartesian coordinate embodiment as such). According to an embodiment, the gemstone can be rotated (ΔΘ) and/or allowed to rotate in a continuous manner for video recording by the camera, from which video file of the recording the gemstone images can be extracted according to an extraction algorithm. According to an embodiment variant the video recording is time stamped and/or an ensemble of frames (Fr) provided with a predefined authentication code Auth code (Σ tagn(Θn,Φn)), and in alternative or supplement embodiment variant, according to a gemstone feature paired with an ID, for the gemstone recognition and/or classification.

gemstone position in respect to the camera can be changed n times 705 for completing all the predefined (according to the microprocessor control) gemstone imaging angles, with the appropriate base positions (ΔΘ) for the imaginary sphere locations, according to the predefined scheme of imaging. According to an embodiment variant the value of n can be considered in approximation as a continuous quantity for image extraction from video recording, positioning 706 the gemstone on the base, position changes and ΔX and ΔY measurements are done automatically by the imaging system, a single gemstone is photographed 707 in both bright field and dark field illuminations.

FIGS. 13, 14 and 15 illustrate embodiments of a method (1300) to recognize an object by an object recognizing system (500) comprising an imaging device such as camera and a moving assembly to move said imaging device around said object. According to the embodiment the method comprises at least one of the following: predefining (1301) an imaginary sphere to comprise at least one path to the imaging locations of said imaging device such as camera, predefining (1302) an Φ-direction increment (ΔΦ) on said sphere surface for the movement path of the imaging device to follow the sphere surface in a first imaging plane, predefining (1303) an Θ-direction increment (ΔΘ) on said sphere surface for the movement of the imaging device to provide an effect as to follow a second path of the sphere surface in a second imaging plane, setting (1304) at least one starting position to said imaging device to start the imaging, collecting (1305) image and/or video data (Fr) (Stn(Θn,Φn)) about the object from an imaging location (n, (Θn,Φn)) into at least one image stack (Stn(Θn,Φn)) by an imaging device from an imaging location defined by the increments (ΔΘ), (ΔΦ) in Θ-direction and Φ-direction to follow at least one path of the imaginary sphere, storing (1306) images (Fr) of at least one of said image stack (Stn(Θn,Φn)) corresponding the imaging location of the imaging device (n, (Θn,Φn)), for a virtual model of the object to be recognized, selecting (1307) a next imaging location (n+1, (Θn+ΔΘ,Φn+ΔΦ)) for the imaging device to collect a next at least one image stack (Stn+1(Θn+1,Φn+1)) corresponding an incremental change of at least one of the Θ-direction increment (ΔΘ) and the Φ-direction increment (ΔΦ), combing (1308) images (Fr) from said at least one image stack with other images from said at least one image stack (St1(Θ$_1$,Φ$_1$)) and/or from another similar at least one image stack for the virtual model (ΘStn(Θ$_n$,Φ$_n$)) of the object to be recognized, recognizing and recording (1309) measures of character (Cr, CoA, Sh, l, Bbl, Auth code) of said object to be recognized from at least one of said images (Fr) of an image stack (Stn), repeating (1310) image collection and selecting a next imaging location for the imaging device to collect a next at least one image stack (St1(Θ$_2$,Φ$_2$)) corresponding an incremental change of at least one of the Θ-direction increment (ΔΘ) and the Φ- direction increment (ΔΦ) until all the predefined (μP) imaging locations of the moving assembly (500) around said object to be recognized has been dealt, comparing (1311) the measures of character (Cr, CoA, Sh, l, Bbl, Auth code) to those in a database, and giving (1312) an identity (ID) to said object to be recognized and to said virtual model of it (ID), if no similarity of compared measures of character found from said database in an inspection (1315). The index n+1 refers to a next position according to the predefined scheme of imaging, with an increment in use in the scheme, according to the used coordinate system. Thus, n has been used as an arbitrary index in illustrating.

According to an embodiment the method comprises as a predefinition (1301, 1302, 1303) at least one of defining a coordinate transformation between the object centric and imaginary sphere centric coordinates (Tr1, Tr2, Tr3), defining a correction between said coordinates if no match observed, correcting the location of the object to be recognized to the center of said imaginary sphere, and adjusting the focus (Foc1, Foc2, Foc3) of said imaging device such as Camera (503) according to the correction to the focus of the camera unit.

According to an embodiment, the method comprises retrieving (1313) said database (DB) by a user given identity, to search a virtual model corresponding said identity of a gemstone. According to a variant the method comprises defining (1314) an area or volume of an object to be recognized with a selection (Selection) of measures of characters in said area or volume, to be used as a search criteria in a search from a database (DB) comprising data about similar objects as the one to be recognized with their measures of characters in the inspection (1315). According to an embodiment database retrieving can be made optionally or in addition in the post analysis phase 708, in suitable part.

According to an embodiment, in the imaging, by the photographing/taking video frames that can be made also repeatedly. According to an embodiment, the illumination can be made also with an illumination that is outside of the wavelength range of visible light. According to an embodiment, the illuminations outside visible range can be made simultaneously, but in another embodiment in series.

According to an embodiment the location of the gemstone under inspection is provided with geographic co-ordinates, to be used as a measure of authenticity for the identity of the gemstone, user and/or the location of the user and/or the gemstone. In an embodiment, the geographic co-ordinates are compared to the co-ordinates of the photographing service provider's location, to provide a source of authenticity signal, made with help of at least one of the following: geographic coordinates, imaging device serial number, imaging device's co-ordinates, signal to noise level, signal quality of a broad band connection used in the connections in the image and/or video data transference and information network bound location of the imaging service provider and/or the device ID in operation. According to an embodiment, several kinds of illuminations can be varied for getting a better contrast about the features of the gemstone to the photographs. According to an embodiment a selection of wavelength ranges are selected for optimization for a specific gemstone feature to be revealed. According to an embodiment at least one of the following can be adjusted in the imaging a gemstone: polarization of a source providing the illumination to the background, polarization of a source providing the illumination to the gemstone, polarization of a camera providing image of the gemstone.

Figure 12:
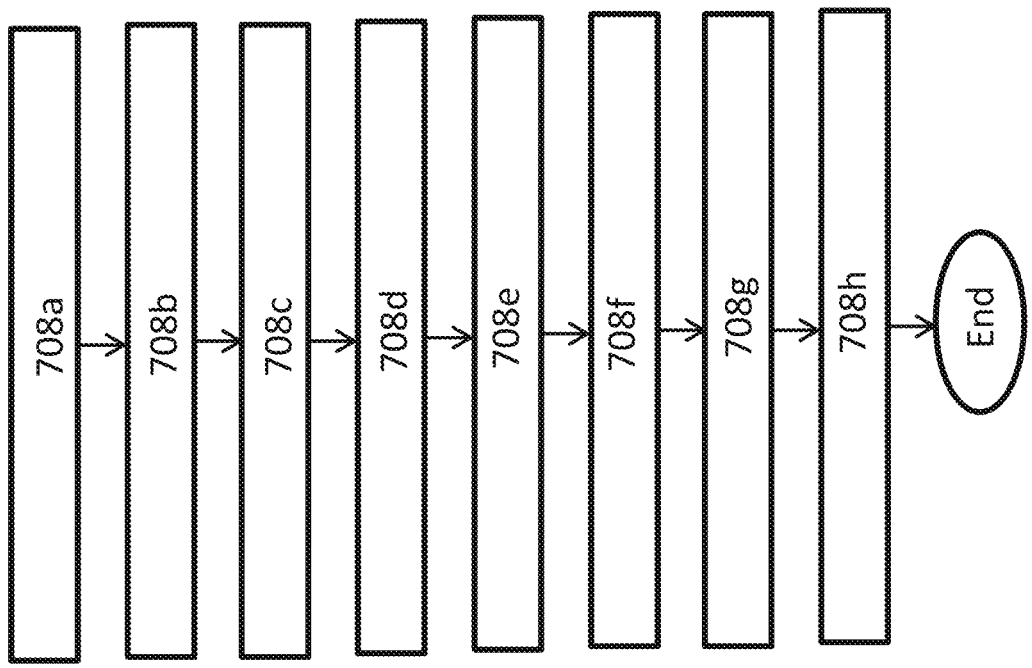
FIGS. 11 and 12 illustrate embodiments related to a method according to an embodiment example, to be used in the example embodiments in suitable part in the present disclosure. According to an embodiment example, the embodied imaging system comprises at least camera, camera boom and base. Therein, camera boom is arranged rotatable over the base, the base can rotate 360 degrees. Gemstones are set on the base and no further securing is needed in the embodiment example.

Images are post-processed 708 according to an embodiment as method steps of the embodied method. According to an embodiment, post-processing comprises at least one of the following being completed (FIG. 12):

background removal 708*a*: everything else except the gemstone is removed from the image, however, gemstone features that belong to the gemstone are not removed, rotation 708*b*: gemstone is "straightened", if experienced necessary because of the ambient conditions, for example centering 708*c*: gemstone is set in the middle of the image canvas, in suitable extent shadowing 708*d*: for enhancing 3D experience adding a shadow to an image and new background 708*e*: a background with required color is added.

According to an embodiment variant, the gemstone features found from the images are marked and/or listed 708*f*. According to an embodiment the identification to the list is relative in respect a location of a feature or an ensemble of such features in the gemstone. According to an embodiment variant, also the illumination properties are listed with observed features 708*g*, and in alternative or in supplement, the authentication signal is saved 708*h* with the feature, for post-analysis purposes to check the authenticity of the observed feature, and/or to add the feature to the feature list of the features of the gemstone under inspection. The operations and processes described and shown above may be carried out or performed in any suitable order as desired in various implementations. Additionally, in certain implementations, at least a portion of the operations may be carried out in parallel, according to an embodiment in parallel in suitable part during applicable method steps of the imaging method 1300. Furthermore, in certain implementations, less than or more than the operations described may be performed.

The coordinate systems can be matched so that imaging can be performed smoothly and quickly. These can be also made in a measuring geometry coordinate system, or in an object's own coordinate system or in suitable part afterwards, so that each frame need not to be matched individually between the coordinates and thus saving time for the imaging. However, the ID in the database may use the a coordinate system with its origo fixed to a position in respect of a selected characteristic measure of the object when describing the characteristic features, although in the measurement the coordinates used by the system were using differently defined origo in the measurement system. Where applicable coordinate transformations can be made according to embodiments.

The optical solution in accordance of an embodiment gives the facility for a depth of field of 10 mm or more is accomplished with a single image using macro magnification.

According to an embodiment, for each gemstone, the photographs taken are processed to form at least one of the following: a 3D applet and predefined video.

According to an embodiment, a gemstone imaging angle has been stored to every image/frame and they can be lined up with many ways for a 3D applet or video processing. According to an embodiment variant this kind of processing can be added to the authenticity signal at the appropriate moment of occurrence. This makes possible to show gemstone movement in the visual model much more ways than just a normal rotation, and respective embodiments to provide a checking facility to examine, what has happened to the gemstone under the inspection, i.e. add to a history log details about the gemstone and its characteristic features. According to an embodiment, the examination can be done via an ordinary normal web browser as such. According to an embodiment of the invention the examination can be thus made at the same location as the photographing according to an embodiment, but alternatively or in addition also in a remote location via a communications network, such as Internet even in a different country, or according to an embodiment in various countries according to the selection of the desired parties to participate to the examination. In such embodiments the authenticity signal can be used for an indication of authenticity of the event, in which the signal is sent and/or for the authenticity of the target under the inspection.

According to an embodiment, the observed features of an examined gemstone are identified, and the gemstone is classified according to the standards available on the classification according to the features representative of the class. If artifacts found, they are also considered in the classification if applicable in the classification. The artifacts are also reported to the gemstone history log, and according to an embodiment such artifacts are marked to the images and/or video, according to a variant embodiment to be used as measures of authenticity.

According to a further embodiment the post processing algorithm has an evaluator machine, as programmatically implemented in communication with other system elements, to evaluate the gemstone volume in respect to the revealed features and/or such features that are held as artifacts, to evaluate a recommendation for cutting and/or honing further the gemstone. According to an embodiment the algorithm in the system attaches that estimate to the gemstone log, for an individual identifiable gemstone, or, for a class suitable limits to characterize the class via the statistical information previously attached to the class.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations and equivalents that better suit each particular use case of the invention.

Example 1

In an embodiment, the radiation source for the illumination provisions comprises a bright field source and/or a dark field source. In an embodiment, the radiation source is adjustable. In an embodiment, the adjusting is implemented in step-wise lighting filed levels, but according to a further embodiment on continuous basis. In an embodiment, there are at least two or more radiation sources, from which to select to at least one with a bright source illumination level or at least one with a dark field source illumination level. In an embodiment, also more than one illumination geometries can be use in accordance of FIG. 1G. In an embodiment, the illumination is provided by an opaque screen in an embodied geometry. In an embodiment, variant polarization of at least one of said illumination sources was adjusted to enhance the visibility of features of the gemstone under inspection. In an embodiment, the bright source had a different polarization than the dark field source. In an embodiment, at least one of the source had polarization selected from the following, elliptical polarization, circular polarization, linear polarization, the chirality being selected for the elliptical and/or circular polarization from left-handed and right-handed chirality. In an embodiment, at least one of the mentioned illumination sources has a polarization feature provided to the transmitted radiation and the camera has a polarizer arranged to an analyzer to identify the polarization of the incoming illumination, at least from the gemstone under inspection by the image/video recording.

In an embodiment, the quality of the radiation is diffuse, i.e. indirect illumination from a radiation source embodied, with an embodied geometry. In an embodiment, in addition or alternative, a radiation source can be embodied by such embodied source that has a spotted source to the target. According to a further variant, there can be a combination of various radiation sources to be used in illumination in an embodiment. In an embodiment variant, the base of the imaging system was used for directing illumination to the target gemstone. In an embodiment, the directing was made as diffuse illumination, to be brought to the object to be imaged via an opaque screen. In an embodiment variant, illumination is embodied as spotted illumination to the whole object.

In an embodiment of the invention, the radiation source is a source of light in optical range. In an embodiment variant, the radiation source comprises at least one of the following: an X-ray source, ultraviolet source, infrared source for providing illumination according to the illumination type just mentioned. According to a further embodiment variant, the radiation source is a single source or an ensemble of such as selected for the wavelength range of camera, but can comprise also another radiation source.

In an embodiment, in the ensemble of illumination sources, there is at least one source that has a polarization feature to emit polarized light. In an embodiment the light is referring to Ultra Violet (UV) and/or InfraRed (IR) radiation. In an embodiment, the radiation to be used for the illumination is monochromatic and/or coherent. In an embodiment, the illumination is a composition of selected monochromatic and/or coherent radiations as such, to provide illumination from several monochromatic illumination sources as a sparse wavelength illumination.

In an embodiment, the illumination is white light, so comprising the wavelength range of the light in the visible optical range between the ultraviolet and infrared. However, similar way for the other type of illuminations the white light can be used as broad wavelength range illumination. In an embodiment, it is possible also to select such an illumination source that is monochromatic to provide where necessary, monochromatic illumination taken photographs. In an embodiment several monochromatic illumination sources can be used together to provide a sparse wavelength comprising illumination, which can be used to highlight certain features of the gemstone. Polarization of at least a source of illumination as embodied and/or camera with analyzer of the polarization state can be used, for the gemstone feature enhancement and/or identification and/or to focus different focal planes inside the gemstone as the object to be recognized.

Example 2

An imaging system was used for photographing a gemstone thoroughly, without any visible attachments to interfere the optical ray passage between the targeted gemstone and the camera. An optical solution according to the embodied system for achieving at least 10 mm depth of field with single image using macro magnification was achieved with an embodied camera. The system was used for observing the photographed gemstone as the target in a three-dimensional manner. In an embodiment, the images of the gemstone were processed to form a 3D applet, and to form a video from the frames to be used in retrieval of the visual model from the gemstone. In an embodiment, at least some of the images were filtered to exclude glare from a phase of the gemstone. In an embodiment, a polarizer for polarization of the illumination was used in the glare removal. In an embodiment, the gemstone was also treated by a sharpener algorithm, and/or the features were marked to the image. In an embodiment, the algorithm estimated the volume of the gemstone, according to a further variant, estimated such a volume that would be left if found features were cut and/or honed away. In an embodiment, the algorithm also estimated the work to be made for such a procedure. In an embodiment, the gemstone was a raw diamond or alike precious stone.

Example 3

In an embodiment, the gemstone was classified and/or it was identified with the features, and the gemstone was given an identity as based on the observed features, to be used in a later identification of the gemstone for retrieval of the images and/or the video for a later examination and/or remote examination. If the features of the gemstone are not sufficiently distinct for an individual characterization of the gemstone, it is classified to a larger ensemble of similar gemstone with similar features. In an embodiment, also raw gemstones can be examined. In an embodiment, the classification was re-estimated after a cut/honing as a processing being made at least partly completed, in comparison to the situation before the made cut/honing with the related estimate.

Example 4

In an embodiment, the system comprises an automated feeder and/or removal unit so that the imaging system can be fully automated to be operative without a human operator, except if errors or mal-function situation occur, such as electricity cut off for example. In an embodiment, the feeder can feed a pre-classified targeted gemstones to the base for the imaging. In an embodiment feeder can be used to pivot or turn the targeted gemstone for another part of imaging sphere to be completed. In an embodiment the removal unit, which can be in an embodiment be the same as the feeder, to be operated inversely, is arranged to remove the targeted gemstone to the location of evaluated/imaged gemstones. If the examination result is available on line in the embodiment in use, the removal function can also comprise a classification action according to the examination result to the corresponding class.

Example 4B

The gemstone holder can be also embodied in the system as such by an electrodynamic holder to capture (FIG. 1H, the components R1 to R4 being electrodynamic field originating and/or F) the gemstone into an electric closure as such. The gemstone can be launched by an electric needle top or tube by an electric field towards an electrodynamic holder comprising a two ring-electrode structure to capture the gemstone, or just simply drop as charged. Such a holder can make the gemstone photographing to be implemented touchlessly. According to an embodiment, the gemstone can be sucked when ready the imaging, and removed from the filter arranged to pick the gemstone into an airflow, the airflow being synchronized to suck the gemstone when the electrodynamic fields are switched off.

According to an embodiment, the light source comprises at least such a light source that is arranged to emit light at the visible range of light with the corresponding wave length. According to an embodiment the wave length range can comprise also such light that has at least partly such wave lengths that belong to the ultraviolet and/or infrared, according to a variant of an embodiment especially near-ultraviolet and/or infrared range of the optical radiation. In an embodiment, the light source is an ambient light being guided via an opaque screen to the object.

According to an embodiment, the gemstone holder as the base (considered also as a sample holder within the embodiments) comprises a vibration suppression arrangement, which is arranged to damp the vibrations that may be interfering the gemstone photographing, especially in such embodiments, in which small sized details are to be detected via the photographing. Small size refers to the detection limit of an eye on average basis. Anyhow, vibrations can make the photographs fuzzy and blur, also in a larger scale and thus a damping mechanism in a base improve the gemstone imagining. According to an embodiment, the vibration suppression comprises a transient damping part, which may suppress also continuously occurring vibrations too, irrespective are they harmonic or not. According to an embodiment variant, the gemstone holder can be situated on a piezo-element or similarly vibrating actuator under control, so that the vibration damping is made in an active way, i.e. by counter vibrations, to be produced and/or sensed by a suitable actuator for the purpose, to sense acoustically or similar way connecting vibrations to the gemstone holder base.

According to an embodiment, the suppression is achieved by an obtained microphone (or similar transducer originating) signal being amplified and phased to be lead to the actuator so that the acoustically coupling noise or similar vibrations are damped in the control of the microprocessor by produced counter phased vibrations to the obtained signal. According to an embodiment, such a damping system can comprise also a vibration sensitive diffractometer that is arranged to be responsive to a scattering of laser light interference patterns detection, the change responsive signal to be used in the counter-vibration production by the suitable actuator in the control of the measurement device (MD). According to an embodiment, the vibration data can be sensed by a sensor and stored into memory, so that the vibration data is available for a later processing of the photographs, for improvement of the photograph quality, especially the sharpness by a software algorithm, in suitable part, in use in an embodied system.

According to an embodiment, the light source can comprises at least one fixed light source that is fixed in at least one of its respects as its position in respect to the gemstone holder, wavelength, illumination brightness and power. Even if in such embodiment further variants fixed or adjustable wavelength light sources were used. According to an embodiment variant, the light source comprises such an additional light source that is positioned to an angle in respect of the detector device. According to an embodiment, the additional light source is arranged into backscattering geometry with the detector comprising device. According to an embodiment variant, the additional light source is arranged into forward-scattering geometry with the detector comprising device. According to an embodiment variant the additional light source is arranged into specular-reflection geometry with the detector comprising device, i.e. into an angle that corresponds an angle between the back-scattering geometry and forward-scattering geometry, i.e. in the range of 45° to 135° from a horizontal plane, as considered being measured to the direction towards the normal of the horizontal plane. According to an embodiment of the invention variant at least some of the light for the gemstone illumination is brought to the target via the sample holder, or in addition or alternative, via an structural part supporting the detector carrying mechanical part. According to an embodiment variant at least part of the illumination is diffuse, and/or indirectly addressed to the gemstone under study. According to an embodiment, the illumination in the imaging mainly used is diffuse, as introduced to the gemstone via an opaque vessel and/or screen.

Example 5

At a remote site, a user, as an examiner, being observing a gemstone being imaged with images processed in a computer, according to the embodied method, to comprise a visual model, cited also as virtual model, by the embodied system. In an embodiment, the images are user retrievable to be observed as a stream of image frames as a video, for a rotation of the object for example. In to an embodiment, visual model comprises also images taken with the embodied system in another illumination. In an embodiment, an examiner is a machine vision provided robot. In an embodiment, the examiner is making a list of the characteristic features at for a classification and/or for a fingerprint of the gemstone to be used as measures of character (1315) and/or measures of authentication in the inspection. In an embodiment, the gemstone with the ID as identified with the fingerprints is added to a gemstone database, with the appropriate classification. In an embodiment the visual model comprises an authentication code/signal for the authentication of the gemstone identification event so that the parties involved the gemstone and/or the devices present in the performance can state the authentic ID of said entities. In an embodiment the remote site connection is provided by a network connection between computers or similar terminal devices, with help of a suitable software.

Example 6

Various embodiments may be implemented at least partially with help of software and/or firmware. This software and/or firmware may take the form of instructions contained in or on a non-transitory computer-readable storage medium. Those instructions may then be read and executed by one or more processors to enable performance of the operations described in the embodiments. The instructions may be in any suitable form for computer execution. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine comprising a microprocessor μP and that cause the machine with the μP to perform any one or more of the techniques of the present disclosure, or that is capable of storing, encoding, or carrying data structures used by or associated with such instructions. Non-limiting machine-readable medium examples may include solid-state memories and optical and magnetic media. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD- ROM disks.

The instructions, for example to how to provide certain frames with authentication code tag, may further be transmitted or received over a communications network using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.).

Example communications networks may include, in suitable part, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. Recognizing site, database and a remote site can use a communications network according to the disclosure, for example via Internet in suitable part for the communication, but also for secure channel for dedicated information exchange such as for the authentication code key, according to an embodiment encrypted form, for example.

The terms "computing device," "computer", "terminal device" "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device, in an applicable part. The device may be either mobile or stationary. According to an embodiment, the remote site can be a mobile site (FIG. 4). Although described as wireless, also wired can be used in suitable part for functional a connection.

Some embodiments may be used in conjunction with various devices and systems for connections to communications network, such as Internet, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a mobile or portable device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, digital video broadcast (DVB) devices or systems, multistandard radio devices or systems, a wired or wireless handheld device, e.g., a smartphone, a wireless application protocol (WAP) device, or the like.

Some embodiments may be used in suitable part in conjunction with one or more types of wired and/or wireless communication signals and/or systems for embodied recognition system communications, following one or more wired and/or wireless communication protocols in suitable part, for example, radio frequency (RF), infrared (IR), global positioning system (GPS), Wi-Fi, Wi-Max, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

As used within this document, the term "communicate" is intended to include transmitting, or receiving, or both transmitting and receiving. The term "communicating" as used herein with respect to a wired and/or wireless communication signal includes transmitting the communication signal and/or receiving the communication signal, for embodying the communications between the sites involved in the visual model retrieval event. Some embodiments may relate to wireless networks that operate in accordance with one of the IEEE 802.11 standards.

Aspects of the disclosure are described above with reference to block and flow diagrams of systems, methods, an ensemble of apparatus, and/or computer program products according to various implementations. It will be understood that one or more blocks of the block diagrams and flow diagrams, and combinations of blocks in the block diagrams and the flow diagrams, respectively, may be implemented by computer-executable program instructions. According to some implementations, some blocks of the block diagrams and flow diagrams may not necessarily need to be performed in the order presented, or may not necessarily need to be performed at all.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. In an embodiment an algorithm can be considered as computer executable program, also in embodiments that are used in controlling an embodied system operations, taking frames for images, making authentication code, controlling camera etc. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks for the operations of the embodied system.

According to an embodiment, imaginary sphere defined location in the imaging can be completed in applicable part by an ensemble of domes, if necessary for the imaging of a complete gemstone all around for its identification. According to an embodiment variant, imaginary sphere comprises at least one sphere half of the imaginary sphere for the ID-recognition of the gemstone. According to an embodiment, then the path of the imaging device around the gemstone to being imaged, follows accordingly at least one dome in such an ensemble of domes. According to an embodiment the gemstone can be re-positioned, i.e. turned or pivoted for another imaginary sphere dome for the imaging such parts that have not been already imaged, in such cases in which such would be required for the imaging, in the identification via the imaginary sphere parts of domes for the recognition. The frames, can be obtained from the gemstone positions, obtained with the help of the measurement device and/or imaging device.

Accordingly, blocks of the block diagrams and flow diagrams support combinations of means for performing the specified functions, combinations of elements or steps for performing the specified functions and program instruction means for performing the specified functions for an embodied system and/or system elements, operations to be made alone and/or in combination with other system elements. It will also be understood that each block of the block diagrams and flow diagrams, and combinations of blocks in the block diagrams and flow diagrams, may be implemented by special-purpose, hardware-based system elements that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method to recognize a gemstone object by a gemstone object recognizing system for an online certificate based on measures of character of the gemstone object, the gemstone object recognizing system including an imaging device and a moving assembly to move said imaging device of an imaging system and the gemstone object in respect to each other, to form a path around said gemstone object on an imaginary sphere, the method comprising:

predefining the imaginary sphere to comprise at least one path to imaging locations of said imaging device;

predefining an $\Phi$-direction increment ($\Delta\Phi$) on a sphere surface of the imaginary sphere for a movement path of the imaging device to follow the sphere surface in a first imaging plane;

predefining an $\Theta$-direction increment ($\Delta\Theta$) on said sphere surface for the movement of the imaging device to follow a second path of the sphere surface in a second imaging plane;

setting at least one starting position to said imaging device to start the imaging;

collecting one or more of image data and video data about the gemstone object from one of the imaging locations into at least one image stack by the imaging device from the one of the imaging locations defined by the increments ($\Delta\Theta$), ($\Delta\Phi$) in the $\Theta$-direction and the $\Phi$-direction to follow at least one path of the imaginary sphere, by an ensemble of camera units of a camera configured to set its focal planes in the gemstone object to produce focal plane specific image stacks for each of the camera units;

storing images of at least one of said at least one image stack corresponding to the one of the imaging locations of the imaging device, for a virtual model of the gemstone object to be recognized;

selecting a next imaging location for the imaging device to collect a next at least one image stack corresponding to an incremental change of at least one of the $\Theta$-direction increment ($\Delta\Theta$) and the $\Phi$-direction increment ($\Delta\Phi$);

combining the stored images from said at least one image stack with other images from one or more of: (i) said at least one image stack and (ii) another similar at least one image stack to obtain the virtual model of the gemstone object to be recognized;

generating an authentication code, for the virtual model for formation of the online certificate, for at least one image stack frame according to an authentication scheme, to authenticate the at least one image stack frame to belong to the same gemstone object to be recognized according to the measures of character;

recognizing and recording the measures of character of said gemstone object to be recognized from at least one of said images of the at least one image stack;

repeating image collecting and selecting a next imaging location for the imaging device to collect a next at least one image stack corresponding to an incremental change of at least one of the $\Theta$-direction increment ($\Delta\Theta$) and the $\Phi$-direction increment ($\Delta\Phi$) until images are collected from all predefined imaging locations of the moving assembly around said gemstone object to be recognized;

comparing the measures of character to stored measures of character stored in a database;

providing an identity to said gemstone object to be recognized and to said virtual model of the gemstone object to be recognized when there is no similarity between the measures of character and the stored measures of character found from said database; and making and providing a certification about the gemstone object to be recognized according to the provided identity recognized based on the measures of character, in an electric form via an information network, wherein the authentication code is configured to be checked for the gemstone object via a secure channel.

2. The method of claim 1, further comprising at least one of:
(i) defining a coordinate transformation between gemstone object centric coordinates and imaginary sphere centric coordinates, and defining a correction between said gemstone object centric coordinates and the imaginary sphere centric coordinates when no match is observed between the gemstone object centric coordinates and the imaginary sphere centric coordinates, and
(ii) correcting a location of the gemstone object to be recognized to the center of said imaginary sphere, and adjusting a focus of said imaging device according to the corrected location.

3. The method of claim 1, further comprising retrieving said database by a user-given identity, to search a virtual model corresponding to said user-given identity.

4. The method of claim 1, further comprising defining an area or volume of the gemstone object to be recognized with a selection of measures of characters in said area or volume, to be used as a search criteria in a search from a database comprising data about similar gemstone objects as the gemstone object to be recognized with the measures of characters.

5. The method of claim 1, further comprising inspecting the measures of character from said virtual model from a screen.

6. The method of claim 1, wherein the measures of character comprise at least one of the following having a location in the gemstone object to be recognized:
an ensemble of inclusions, each of the inclusions having a location in the gemstone object to be recognized,
an ensemble of cracks, each of the cracks having a location in the gemstone object to be recognized,
an ensemble of shadow formations, each of the shadow formations having at least one of location, size, and opacity,
color,
each anomaly of an ensemble of color anomalies,
an index of refraction,
each anomaly of an ensemble of local anomalies in index of refraction,
a number of facets,
geometric measures of the object in 3D,
a regularity in shape,
measures of regular forms comprising at least one of crown dimensions and pavilion dimensions, and
opacity.

7. The method of claim 1, wherein the recognizing is based at least partly on a predefined selection of an ensemble of said measures of characters.

8. The method of claim 1, further comprising accessing reference data in a database location that is outside a location of a controller of the imaging device.

9. The method of claim 8, wherein said database location is at least one of the Internet, and one or more of: (i) an information network-defined network location and (ii) an information network-defined geographic location.

10. The method of claim 1, further comprising adding one or more of: (i) an authentication tag and (ii) the authentication code to the virtual model of the gemstone object to be recognized or its part thereof.

11. The method of claim 10, wherein one or more of said authentication tag and the authentication code is added to a selected image or frame that is an image or frame of an ensemble of selected images and respective frames to be marked by the one or more of said authentication tag and authentication code.

12. The method of claim 11, wherein one or more of said authentication tag and the authentication code is a steganographic marking.

13. The method of claim 12, wherein the method comprises defining the image and/or frame to be marked by a first series of selected Fibonacci numbers and/or defining the tag in the image by a second series of selected Fibonacci numbers.

14. The method of claim 10, wherein the tag/or tag and/or code comprises in addition at least one of geographic coordinates of the virtual model recording location, date of recording and operator identity.

15. The method according to claim 1, wherein the imaging device in the gemstone object recognizing system comprises a camera and an adjustable focusing optics to the optical axis.

16. The method of claim 15, wherein said adjustable focusing optics comprises at least one of the following:
a co-axial beam splitter to split, between one of the camera units and an additional one of the camera units of the camera, the image to be recorded from different depths accordingly, and
an ensemble of co-axial beam splitters in series to split the image to be recorded between an ensemble of additional camera units of said camera, each of the additional camera units having an additional-camera-specific optics to focus according to adjustment to additional-camera-specific-depth into the gemstone object to be recognized.

17. The method of claim 16, wherein the adjustable focusing optics comprise an interferometer to filter, to the image of one of the camera units, an illumination used in illuminating the gemstone object to be recognized.

18. The method of claim 15, wherein the at least one image stack of each camera is processed in each thread in an individual pipeline utilized in formation of the virtual model.

19. The method of claim 1, wherein the certification about the gemstone object to be recognized according to the identity is recognized by one or more of: (i) in an electric form, (ii) on paper, and (iii) on corresponding media.

20. The method according to claim 1, wherein the gemstone object to be recognized is one of a gemstone, a gemstone cut into form, a raw gemstone, a diamond, a piece of jewelry, an industrial stone, and a diamond.

21. The method of claim 1, further comprising defining the increments in Cartesian coordinates.

22. A non-transitory computer-readable medium storing computer-executable instructions which when executed by one or more processors result in performing operations that execute the method according to claim 1.

23. An imaging system configured to recognize a gemstone object, the imaging system comprising:
a processor;
a memory storing instructions which, when executed by the processor, perform operations of the method of claim 1;
the camera;

a camera support configured to support the camera and facilitate a respective movement of the camera and the targeted gemstone object with respect to each other; and a base to hold the gemstone object and facilitate a respective movement of the gemstone object with respect to one or more of the camera and the camera support.

24. The imaging system of claim 23, wherein the imaging of the target as the gemstone object to be recognized is made from system-predefined imaging angles.

25. The imaging system of claim 23, further comprising a radiation source for illuminating the gemstone object as the gemstone object to be recognized, in an illumination screen geometry.

26. The system of claim 24, further comprising an accessory to provide an optical path to an otherwise dead-angle of the gemstone object, a polarizer of an illumination source, and a polarizer at the camera as an analyzer.

27. The system of claim 24, wherein illuminating the gemstone object to be imaged comprises at least one of the following light sources:

a laser,
an eximer laser,
a white light source,
a light source with few characteristic wavelengths,
an X-ray source to produce excitation of elements of the gemstone object,
a UV source to enhance features of the gemstone object,
a point source comprising at least one of the light sources,
a diffuse light source comprising at least one of the light sources operable via a screen in a screen geometry, the diffuse light source being configured to indirectly illuminate the gemstone object to be imaged.

28. The system of claim 24, wherein the base includes a vibration damping system configured to improve image quality.

29. The system of claim 23, further comprising an ensemble of camera units of the camera configured to set its focal places in the gemstone object configured to produce focal plane specific image stacks for each of the camera units.

* * * * *